(12) United States Patent
Pedraza et al.

(10) Patent No.: US 9,068,778 B2
(45) Date of Patent: Jun. 30, 2015

(54) APPARATUS, SYSTEM AND METHOD FOR MONITORING A DRYING PROCEDURE

(75) Inventors: Mark A. Pedraza, San Diego, CA (US); Richard G. Lubeski, Vista, CA (US); Mark A. O'Connell, San Diego, CA (US)

(73) Assignee: RM2, INC., Vista, CA (US)

( * ) Notice: Subject to any disclaimer, the term of this patent is extended or adjusted under 35 U.S.C. 154(b) by 403 days.

(21) Appl. No.: 12/140,165

(22) Filed: Jun. 16, 2008

(65) Prior Publication Data

US 2008/0249654 A1     Oct. 9, 2008

Related U.S. Application Data

(63) Continuation of application No. 11/639,571, filed on Dec. 15, 2006, now Pat. No. 7,403,126, which is a continuation of application No. 10/877,417, filed on Jun. 25, 2004, now Pat. No. 7,173,538.

(51) Int. Cl.
| | |
|---|---|
| *G08B 21/00* | (2006.01) |
| *F26B 25/22* | (2006.01) |
| *F24F 11/00* | (2006.01) |
| *F24F 3/14* | (2006.01) |
| *E04B 1/70* | (2006.01) |

(52) U.S. Cl.
CPC .............. *F26B 25/22* (2013.01); *F24F 11/0015* (2013.01); *F24F 3/14* (2013.01); *F24F 11/0008* (2013.01); *E04B 1/70* (2013.01)

(58) Field of Classification Search
CPC ......... F26B 25/22; F24F 3/14; F24F 11/0008; F24F 2011/0091; F24F 2003/144; F24F 2011/0068; F24F 11/0015; A61B 2017/00084; E04B 1/70; G06Q 10/06; G06Q 10/10
USPC .............. 340/604; 236/44 C, 44 A; 165/224; 34/418; 700/276
See application file for complete search history.

(56) References Cited

U.S. PATENT DOCUMENTS

| | | | | |
|---|---|---|---|---|
| 4,281,489 | A * | 8/1981 | Kallestad et al. ............... 52/192 |
| 5,953,926 | A * | 9/1999 | Dressler et al. ................. 62/175 |
| 6,122,840 | A * | 9/2000 | Chbat et al. ..................... 34/496 |
| 6,161,763 | A * | 12/2000 | Reuter ........................ 236/44 C |
| 6,457,258 | B1 * | 10/2002 | Cressy et al. ................... 34/443 |
| 6,530,160 | B1 * | 3/2003 | Gookins ......................... 34/418 |
| 6,646,564 | B1 * | 11/2003 | Azieres et al. ................ 340/679 |
| 6,662,467 | B2 * | 12/2003 | Cressy et al. ................... 34/443 |
| 6,950,767 | B2 * | 9/2005 | Yamashita et al. .............. 702/81 |
| 6,970,539 | B2 * | 11/2005 | Yamamoto et al. ...... 379/102.05 |
| 6,978,631 | B2 * | 12/2005 | Fuller .......................... 62/176.6 |
| 6,995,676 | B2 * | 2/2006 | Amacher ...................... 340/602 |
| 7,031,778 | B2 * | 4/2006 | Hsiung et al. ................... 700/29 |
| 7,173,538 | B2 * | 2/2007 | Pedraza et al. ................ 340/604 |
| 7,236,120 | B2 * | 6/2007 | Healy et al. ..................... 342/22 |

(Continued)

*Primary Examiner* — Wu Daniel
*Assistant Examiner* — Quang D Pham
(74) *Attorney, Agent, or Firm* — Gavrilovich, Dodd & Lindsey, LLP; Charles D. Gavrilovich, Jr.

(57) ABSTRACT

An apparatus, system, and method provide drying procedure information through a user interface. A monitoring device transmits drying procedure data measured by sensors within a structure undergoing the drying procedure to a server. In response to requests received through a communication network from a user interface, the server transmits the drying procedure information that is presented through the user interface. A variety of information and services related to the drying procedure may be provided through the user interface.

26 Claims, 9 Drawing Sheets

(56) References Cited

U.S. PATENT DOCUMENTS

| | | | |
|---|---|---|---|
| 7,243,050 B2* | 7/2007 | Armstrong | 702/188 |
| 7,386,988 B1* | 6/2008 | Petschauer | 62/176.6 |
| 7,403,126 B2* | 7/2008 | Pedraza et al. | 340/604 |
| 7,768,412 B2* | 8/2010 | Vokey | 340/604 |
| 7,900,374 B2* | 3/2011 | Bae et al. | 34/491 |
| 8,006,407 B2* | 8/2011 | Anderson | 34/381 |
| 8,640,360 B2* | 2/2014 | Stamm et al. | 34/418 |
| 8,720,080 B2* | 5/2014 | Jayne et al. | 34/352 |
| 2002/0050932 A1* | 5/2002 | Rhoades et al. | 340/870.16 |
| 2003/0033057 A1* | 2/2003 | Kallestad | 700/277 |
| 2003/0222783 A1* | 12/2003 | Amacher | 340/604 |
| 2004/0133314 A1* | 7/2004 | Ehlers et al. | 700/276 |
| 2004/0163102 A1* | 8/2004 | Fowler et al. | 725/12 |
| 2005/0013727 A1* | 1/2005 | Hedman | 422/3 |
| 2005/0131652 A1* | 6/2005 | Corwin et al. | 702/127 |
| 2005/0220662 A1* | 10/2005 | Hedman | 422/1 |
| 2005/0285748 A1* | 12/2005 | Pedraza et al. | 340/602 |
| 2007/0276626 A1* | 11/2007 | Bruffey | 702/182 |
| 2009/0151190 A1* | 6/2009 | Anderson | 34/427 |
| 2010/0024244 A1* | 2/2010 | Potter | 34/474 |
| 2010/0125367 A1* | 5/2010 | Burton et al. | 700/276 |
| 2012/0227280 A1* | 9/2012 | Hopkin et al. | 34/492 |

* cited by examiner

APPARATUS, SYSTEM AND METHOD FOR MONITORING A DRYING PROCEDURE

RELATED PATENT APPLICATIONS

This application is a continuation application of U.S. patent application Ser. No. 11/639,571, entitled APPARATUS, SYSTEM AND METHOD FOR MONITORING A DRYING PROCEDURE, filed on Dec. 15, 2006 now U.S. Pat. No. 7,403,126 which is a continuation application of U.S. patent application Ser. No. 10/877,417 entitled APPARATUS, SYSTEM AND METHOD FOR MONITORING A DRYING PROCEDURE filed on Jun. 25, 2004, now U.S. Pat. No. 7,173,538 which are incorporated by reference in their entirety, herein.

BACKGROUND OF THE INVENTION

The invention relates in general to drying procedures and more specifically to an apparatus, system and method for monitoring a drying procedure of a building structure.

Systems and devices are used to dry the walls, floors, ceilings and other parts of the inside of a building such as a home or office after the building has been exposed to unusually high amounts of moisture or water. Undesired moisture and water may enter one or more rooms of the building through any of several ways. A fire sprinkler system may be activated in response to a fire, for example. Fire fighters often use water to control fires within a building. The building may be flooded due to high water levels that have risen in the surrounding area. In addition, pipes may burst or otherwise leak exposing the building to water and moisture. Conventional systems employ a variety of equipment to dry the interior of a building structure after exposure to water. Air movers such as electric fans are used to move moist air away from building structure components that are being dried such as wet floors, walls, or ceilings. If required, one or more dehumidifiers are used to extract moisture from the air. In some situations, heaters are used to increase the ambient temperature to increase evaporation and decrease drying time. The type of equipment, equipment settings, and drying times should be precisely determined, planned, and adjusted for a drying project.

Conventional systems, however, have several limitations. For example, the drying procedure must be monitored by drying technicians that must visit the project site often. Occasionally, drying techniques must be adjusted for environmental changes such as changes in temperature and humidity. Further, building occupants may disturb equipment settings or position. For example, a home owner may unplug a fan or other equipment during the night because of noise. When visiting a project site, a technician must often reevaluate the conditions and may need to take measurements and physically inspect the site to determine the appropriate continued action to safely dry the building. Such requirements are expensive and result in relatively slow adjustments since no corrective measures can be taken until after a technician has visited the site. Also, third parties such as insurance companies are often interested in the reasons for adjustments, delays and variations in costs of the drying procedure. Due to conditions out of the control of the drying technician, a project may increase in cost giving the appearance of incompetence, or sometimes, the appearance of deceptive behavior to the third party.

Accordingly, there is need for an apparatus, system, and method for monitoring a drying procedure of a building structure.

DETAILED DESCRIPTION OF THE PREFERRED EMBODIMENTS

In an exemplary embodiment of the invention, drying procedure information based on drying procedure data is presented through a user interface. Sensors at a building structure that is undergoing a drying procedure provide at least a portion of the drying procedure data that is transmitted from the building structure through a communication network to a server. The server generates the drying procedure information based on the received drying procedure data and transmits the drying procedure information through a communication network to the user interface where it is presented to the user. The drying procedure information includes calculations, estimations, measurements, photographs, thermal images, graphs, tables, text, building structure renditions such as three dimensional virtual "walk-through" models, and other information related to the drying procedure performed at the building structure. In the exemplary embodiment, the user interface includes a personal computer connected to the server through the Internet where Web browser software running on the personal computer facilitates the exchanges of messages and information between the user and the server. The monitoring apparatus, system, and method allow monitoring of the drying procedure by any authorized user having access to the server.

Figure 1:
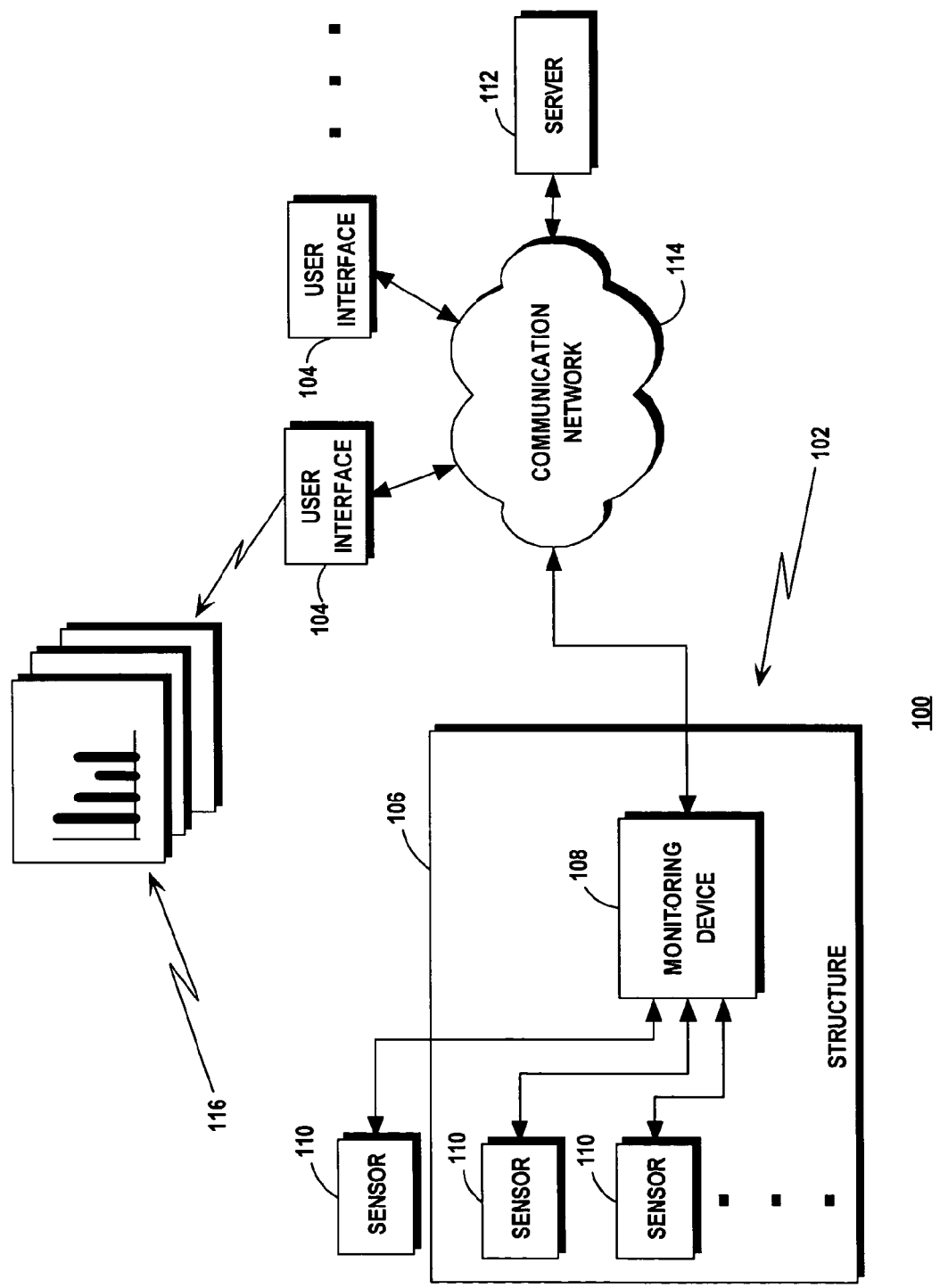
FIG. 1 is a block diagram of a drying procedure managing system in accordance with the exemplary embodiment of the invention.

FIG. 1 is a block diagram of a drying procedure monitoring system 100 in accordance with the exemplary embodiment of the invention. The monitoring system 100 is implemented using any combination of devices, hardware, software and firmware that captures drying procedure data at a drying procedure site 102 and presents drying procedure information 116 based on the drying procedure data through a remote user interface 104. The drying procedure information 116 includes any combination of video, audio, and multimedia objects illustrating graphs, tables, images, photographs, interactive virtual models, numbers, and text that describe or otherwise relate to the drying procedure that is being performed, has been performed, or will be performed at a building structure 106. The drying procedure information 116 may include estimates, calculated values, and measured values based on the drying procedure data obtained at the building structure 106. Examples of drying procedure information 116 include measured, estimated and calculated values related to drying times, equipment costs, labor costs, electrical power consumption, moisture levels, temperatures, humidity levels, air quality, evacuated water, locations of personnel, locations of equipment, locations of building structures, and locations of damaged structure areas. Further, drying procedure information 116 may include photographs, digital images, thermal images, videos or other pictorial representations of the building structure 106 or damaged areas. Further, the drying procedure information 116 may include information regarding preferred equipment placement and the preferred status of windows and doors. The drying procedure information 116, therefore, may convey the progress of the drying procedure, environmental conditions, operational characteristics of drying equipment, or any other information that may be useful to a user interested in the drying procedure.

In the exemplary embodiment, the monitoring system 100 is installed by the drying procedure technician within the building structure 106 to be dried by placing the monitoring device 108 in a convenient location, typically near the center of a room to be dried, and by strategically placing one or more sensors 110 throughout the room. The monitoring device 108 receives data from the sensors 110 and transmits corresponding data messages to a server 112 through a communication network 114. The server 112 processes the data messages to determine drying procedure information 116 that can be displayed or otherwise presented to a user through a user interface 104. As explained in further detail below, the user interface 104 includes a computer that is communicatively connected to the server 112 in the exemplary embodiment. With the appropriate authorization and authentication, a user accesses the drying procedure information 116 using web browser software running on the computer. Although the drying procedure information 116 may include "raw" data in some circumstances, the drying procedure information 116 is presented in a user friendly format such as a graphical, pictorial, or easily read textual presentation. In the exemplary embodiment, multiple views within a virtual "walk-through" model pictorially represent one or more rooms within the building structure 106 and show walls, ceilings, and floors with moisture levels represented as colored, shaded or crosshatched sections. In some circumstances, different colors may be used to represent different moisture levels.

In the exemplary embodiment, the technician enters some of the drying procedure data through a user interface (not shown) of the monitoring device 108. Examples of drying procedure data that can be entered by the technician include room dimensions and initial moisture measurements. In some circumstances the drying procedure data may be provided by a database or service. As discussed below for example, weather services may provide drying procedure data such as outdoor temperature and humidity levels. Information may obtained from a internet web site that provides weather related data such as temperature and humidity levels corresponding to particular geographical areas.

Although a single sensor 110 may be used in some circumstances, a plurality of sensors 110 are strategically placed within the building structure 106 that is undergoing the drying procedure in the exemplary embodiment. The sensors 110 may include peripheral sensors 110 connected to the monitoring device 108 and integral sensors (not shown) implemented as part of the monitoring device 108. The peripheral sensors 110 may be positioned inside or outside the structure and are referred to herein as interior and exterior sensors 110. Examples of suitable sensors 110 include penetrating moisture sensors, non-penetrating moisture sensors, temperature sensors (thermometers), pressure sensors (barometers), electric current sensors, voltage sensors, power sensors, humidity sensors (hygrometers), mold detectors, air particle detectors, and airflow sensors. The number and types of sensors 110 installed at the building structure 106 depend on the particular system 100 implementation, the size of the building structure 106, the number and size of rooms within the building structure 106, the estimated volume of water that must be removed, the distribution of water within the building structure 106, the types of materials that are holding excess moisture, the available communication bandwidth, and other factors recognized by those skilled in the art based on these teachings. As discussed below, for example, a non-penetrating remote moisture sensor (scanning moisture sensor) continually scans the room including the ceiling, walls and floor in a second exemplary embodiment where the monitoring device 108 includes a scanning mechanism.

The monitoring device 108 receives the drying procedure data from the sensors 110 and the technician, performs any required processing and buffering, and transmits the drying procedure data through the communication network 114 to the server 112. The communication network 114 may be any combination of circuit switched, packet switched, analog, digital, wired and wireless communication equipment and infrastructure suitable for transmitting signals to the server 112. The communication network 114, therefore, may include one or more of the following: an Intranet, the Internet, a cellular communication system, a wireless data system, a Public Switched Telephone Network (PSTN), a private telephone network, a satellite communication system, or point to point microwave system. In the exemplary embodiment, the monitoring device 108 is connected to the communication network 114 through a wireless link provided by the communication network 114 which includes at least a wireless system and the Internet. Depending on the particular communication network, the monitoring device 108 may send signals in accordance with a Wireless Application Protocol (WAP), FCC 802.11 standards, a proprietary protocol or other types of communication protocols. An example of suitable wireless link between the monitoring device 108 and the communication network 114 is a wireless Internet link provided through a cellular service provider. The data message signals are routed to the server 112 based on an IP (Internet Protocol) address in the exemplary embodiment. The server 112 deciphers the incoming signals to extract the appropriate data. The drying procedure data is processed to generate drying procedure information 116 that can be displayed or otherwise presented through the user interface 104. In the exemplary embodiment, the user interface 104 is implemented with a Web browser application running on a computer connected to the server 112 through the Internet within the communication network 114. By designating the appropriate IP address, a user can access the server 112 and view the drying procedure information 116. Additional security and authentication mechanisms may also be utilized in some circumstances.

In the exemplary embodiment of the invention, therefore, drying procedure data measured by at least one sensor at the drying procedure site is transmitted by the monitoring device 108 from the drying procedure site 102 through the communication network 114 to the server 112. The server 112 generates drying procedure information 116 based on the drying procedure data. The drying procedure information 116 is presented through a user interface to a user, such as a home owner, contractor, or insurance company representative, to provide drying procedure information 116 such as information related to estimated drying time, necessary equipment, moisture levels, changes in estimated drying times, changes in moisture levels and notice of secondary leaks. The exemplary embodiment of the invention is particularly useful in providing insurance representatives and insurance adjusters an accurate estimate of the required equipment, cost and time to complete the drying procedure before the drying procedure is started. Further, the insurance representative may monitor, in real-time, the drying procedure conveniently from a computer or other device connected to the Internet. Since estimates are produced by a predetermined calculation performed by the server in accordance with recommended practices, accidental as well as intentional inaccuracies of estimates are minimized. Further, if adjustments in the drying procedure are necessary, the monitoring system 100 allows the changes to be verified and, in many circumstances, will indicate the reason for the change. For example, if a drying procedure estimate includes a drying time of three days and during the drying procedure it is determined that four days are required, the insurance representative can verify the need for the extra day by accessing the drying procedure information 116. Continuing with the example, the monitoring system 110 may determine that the need for the extra day results from the disabling of a fan or a dehumidifier by detecting a relationship between the voltage and current used by the particular device. By providing information that can be evaluated by parties other than the drying technician, errors as well as fraudulent and unscrupulous behavior are minimized. Also, liability of inadequate drying procedures and costs associated with adjustments can be efficiently allocated. For example, if the structure owner interferes with the drying procedure by turning off noisy equipment, the costs of extra drying procedure time is billed directly to the structure owner rather than allocated to the insurance company or the contractor performing the procedure. A drying procedure history is maintained by storing drying procedure data in memory. The drying procedure history can be presented to the user as drying procedure information 116 allowing the user to access the information for any number of reasons. Analysis of deviations from the expected results and documentation of deviation causes can be easily performed, stored and shared.

Figure 2:
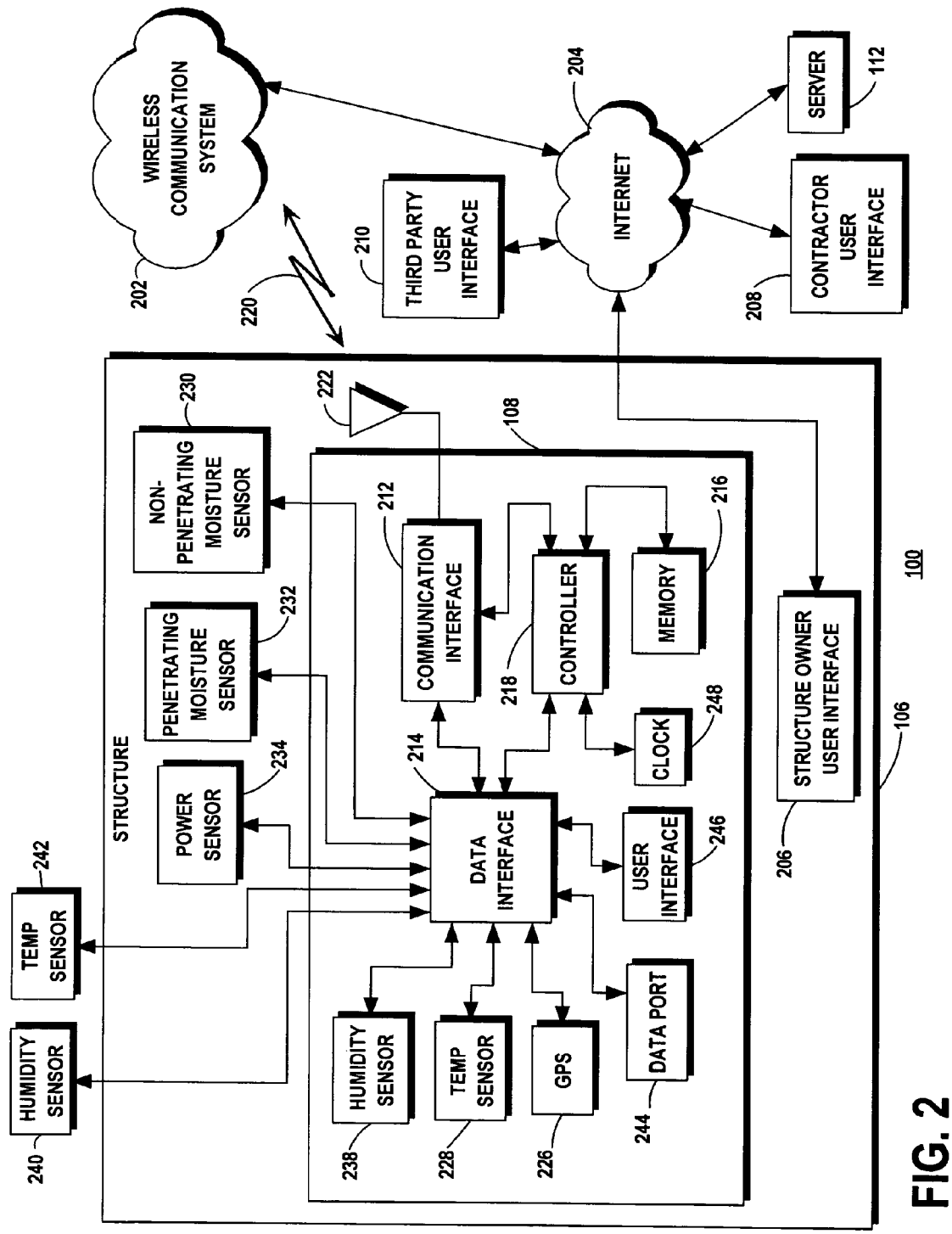
FIG. 2 is a block diagram of a monitoring system in accordance with the exemplary embodiment of the invention where the communication network includes at least a wireless communication system and an Internet.

FIG. 2 is a block diagram of a managing system 100 in accordance with the exemplary embodiment of the invention where the communication network 114 includes at least a wireless communication system 202 and an Internet 204. The various functional blocks illustrated in FIG. 2 may be implemented in any number of analog or digital circuits, integrated circuits (ICs), Application Specific Integrated Circuits (ASICs), processors or other devices. The communication network 114 may include various systems, components and networks that are interconnected. In the exemplary embodiment, the communication network 114 includes at least a wireless communication system 202 and the Internet 204 which facilitate packet switched communication between the monitoring device 108 and the server 112. Other communication infrastructure such as PSTN systems, electronic switches, routers, twisted pair wires, digital subscriber line (DSL) systems, telephone over cable television infrastructure and other systems and equipment may also be connected within the communication network 114.

Although a single monitoring device 108 is shown in FIG. 2, more than one monitoring device may 108 be used in a single building structure 106 in some circumstances. In addition, a single monitoring device 108 may act a master device and may be in communication with one or more monitoring device 108 performing as slave devices. Any of several techniques may be used to network the master and slave devices including wireless links such as, cellular telephony, Bluetooth, two-way radio, or wired connections using cables.

In the exemplary embodiment, the user interfaces 110 include a structure owner user interface (structure owner UI) 206, a contractor user interface (contractor UI) 208 and a third party user interface (third party UI) 210 that are connected to the server 112 through the Internet 204. Any number of user interfaces 206-210 (collectively referred to as user interfaces 104) may be used. Although other techniques may be used in some circumstances, the user interfaces 206-210 are implemented using web browser software running on computers connected to the Internet 204. Suitable examples of web browser software include Microsoft Explorer and Netscape Navigator applications. Suitable operating systems include Windows based systems as well as Macintosh based systems. Although the third party UI 210, contractor UI 208 and the structure owner UI 206 may be identical except for their location, the drying information 116 accessible by a particular party may be displayed differently or may include less or more information than is accessible by other parties in some situations. For example, an insurance company representative may use a third party UI 210 to access cost estimate information for a particular drying procedure. Using an identification (ID) and password, the insurance company representative logs onto the server 112 and enters the appropriate login information, such as a claim number, to access information for a particular drying procedure. A home owner accessing the same drying procedure project through a structure owner UI 206 may have limited access to the drying procedure information 116. Some cost estimates, for example, may not be available since they may be considered to be confidential by the insurance company or the contractor. The home owner may only be authorized to access drying procedure associated with their property (102) in some circumstances. Further, the contractor may have additional authorization to provide control instructions to equipment or to the monitoring device 108 where other users are restricted from changing the configuration of the system 100 or equipment. The differences between the user interfaces 206-210 in the exemplary embodiment, therefore, may be based on a difference of hardware and software or may only be based on the content that is presented in response to the particular authorization.

The computer used for a user interface 104 (206-210) includes at least an output device such as a video monitor or display and an input device such as a keyboard or computer mouse. Other types of input and output devices can be used in some circumstances. For example, the output device may include a speaker and the input device may include a microphone, a touch-screen, joystick, or a touch pad. In accordance with known techniques, the computer is connected to the Internet 204. An example of a suitable connection includes establishing a communication link through an Internet Service Provider (ISP) and modem connected to a communication infrastructure such as cable communication system or a PSTN. In some circumstances, other techniques can be used to establish a communication link with the server 112. Other suitable communication links include wireless communication links using WAP or WiFi connections and computer network connections such as Ethernet and token ring systems, for example.

In the exemplary embodiment, the wireless communication system 202 is a cellular telephone system with packet switched mobile data capability such as ARDIS, RAM, or CDPD services. As is known, these systems provide a communication data packet formed offline and a header and error correction that is added prior to transmission. A dedicated communication link, therefore, is not utilized in the exemplary embodiment. In some situations, a circuit switched dedicated communication link may be used. For example, a "dial-in" wireless internet communication service over the cellular telephone system can be used to for the wireless communication link 220. Some wireless communication systems, for example, provide wireless internet access with the use of a wireless modem that can be connected to a laptop computer or personal digital assistant (PDA). The wireless communication systems may utilize any communication protocol and modulation such as, for example, Code Division Multiple Access (CDMA), Time Division Multiple Access (TDMA), Advanced Mobile Phone Service (AMPS), General Packet Radio Service (GPRS), or Global System for Mobile Communications (GSM) in accordance with known techniques.

The wireless communication system 202 forwards the data through the Internet, and possibly other communication networks, to the server 112. In some circumstances, a cellular voice channel may be used to transmit data to the server 112. In such a circumstance, the monitoring device 108 establishes a cellular call with a modem connected to the server 112, either directly or through a network. The call can be terminated after data has been transferred and reestablished as needed or it may be maintained throughout the monitoring process.

The monitoring device 108 includes at least a communication interface 212, a data interface 214, memory 216 and a controller 218. In the exemplary embodiment, the monitoring device 108 includes other circuitry and equipment not illustrated in FIG. 2 such as, for example, power supply circuitry, connectors, housings and other mechanical and electrical components. Further, some of the sensors 110 are implemented as part of the monitoring device 108 in the exemplary embodiment. The various functional blocks of the monitoring device 108 may be implemented in any combination of analog or digital circuits, integrated circuits (ICs), Application Specific Integrated Circuits (ASICs), processors or other devices. Software code running on the controller 218 facilitates the exchange of signals and information between the various functional blocks of the monitoring device 108 to perform the functions described herein as well as facilitating the overall functionality of the monitoring device 108. Further, the functional blocks, or portions of the functional blocks may be implemented in other devices. The communication interface 212, for example, may be at least partially implemented within a cellular telephone or a single IC device may be used for the memory 216 and the controller 218. Therefore, the various functional blocks in FIG. 2 are presented for illustrative purposes and the described functions may be performed in any of several component configurations or circuitry as will be recognized by those skilled in the art by applying the teachings herein in accordance with known techniques.

The communication interface 212 is any arrangement of hardware and software that facilitates communication through the communication link 220 with the wireless communication system 202. The communication interface 212 includes an antenna 222 for transmitting and, in some circumstances, receiving radio frequency (RF) signals. Although the communication interface 212 and the controller 218 are illustrated as separate functional blocks, at least a portion of the communication interface 212 can be implemented in the controller 218. In the exemplary embodiment, the communication interface includes radio frequency (RF) circuitry such as amplifiers (not shown) and filters (not shown). Data received from the data interface 214 is processed, modulated and transmitted through the wireless communication link 220 in accordance with instructions received from the controller 218. In the exemplary embodiment, the communication interface 212 demodulates and processes signals received through the wireless communication link 220 and forwards the demodulated signals to the controller 218 or to the data interface 214. The received signals include control signals for configuring the monitoring device 108 and, in some cases, the sensors 110 and the drying equipment. An example of a suitable communication interface 212 is a wireless modem.

The data interface 214 includes any combination of hardware, software, and firmware for receiving data from the plurality of sensors 110. In the exemplary embodiment, the data interface includes several sensor connectors accessible from the exterior of a housing of the monitoring device 108. The data interface includes analog to digital (A/D) converters for converting analog voltage signals from the sensors to a digital format that can be interpreted by the controller 218. In some circumstances, the sensors 110 provide digital signals and the data interface forwards the data to the controller 218 in a readable format. Accordingly, the connectors and interface protocols within the monitoring device 108 are implemented in accordance with the types of devices that are intended to be connected.

As discussed above, the plurality of sensors 110 include peripheral sensors and integral sensors, where some of the peripheral sensors include exterior sensors installed outside the building structure 106 and interior sensors installed within the building structure 106 but outside a housing of the monitoring device 108. The peripheral sensors include sensors that provide either a digital or analog data signal that can be received by the data interface 214. Although the external sensors 110 may be communicatively connected to the data interface 214 using any of several techniques, the peripheral sensors 110 sensors are connected to the data interface using cables in the exemplary embodiment. Other techniques for connecting the peripheral sensors 110 include using wireless techniques such as infrared and radio frequency (RF) communication links. Bluetooth devices, for example, may be used to connect the sensors 110 to the data interface 214 in some circumstances.

In the exemplary embodiment, the peripheral sensors 110 include at least one power sensor 234, at least one penetrating moisture sensor 232 and at least one non-penetrating moisture sensor 230. The power sensor 234 is any commercially available sensor that at least detects the presence of voltage and current flow through a wire when the sensor is placed near an insulated conductor. A suitable example of a power sensor includes a clamp-on power sensor with Hall Effect semiconductor devices that allow measurement of the magnetic field around the conductor. The power sensor 234 measures a voltage level between two conductors as well as a measuring the current traveling through the conductors and thereby measuring power.

The penetrating moisture sensor 232 provides a digital or analog signal indicating the moisture level in a material in which the penetrating moisture sensor is installed. An example of a suitable penetrating moisture sensor 232 includes a two-prong moisture sensor that provides a moisture level data based on the impedance between two probes inserted into the target material. The penetrating moisture sensor 232 is typically installed in materials that can be penetrated such as drywall, some types of wall coverings, and carpeting.

The non-penetrating moisture sensor 230 provides a digital or analog signal indicating the moisture level in a material that is not easily penetrated such as concrete, wood, stucco, and tile. An example of a suitable non-penetrating moisture sensor 230 includes a moisture sensor having a plurality of contacts that can be placed against the target surface. A moisture content of the target material is provided based on an impedance between the contacts.

In the exemplary embodiment, the peripheral sensors include exterior sensors 204-242 that are placed outside of the structure. The exterior sensors include at least a humidity sensor 240 such as a hygrometer and a temperature sensor 242.

Any number of peripheral sensors 110 can be used where the number and placement depends on several factors used by technicians in the field. Some examples of the factors that may be relevant in a particular drying procedure include the size of the room, the humidity, barometric pressure and temperature in the room, the location and distribution of moisture in the walls, ceiling and floor, and the number and distribution of drying devices within the room.

In the exemplary embodiment, the monitoring device 108 includes integral sensors including a humidity sensor 238, a temperature sensor (thermometer) 228, and a GPS (Global Positioning System) receiver 226. Other types of sensors can be used in some circumstances. As described below in further detail, for example, a remote moisture sensor, a distance sensor, and a digital camera are implemented as part of the monitoring device 108 in the second exemplary embodiment of the invention that includes a scanning mechanism.

The humidity sensors 238, 240 provide data signals indicating the relative humidity of the air. Any of several commercially available sensors that provide either an analog or digital output can be used. The data interface 214 is configured to communicate with the particular sensor 238, 240.

The temperature sensors 228, 242 provide a digital or analog data signal indicating the temperature of the air. An example of a suitable temperature sensor includes a thermocouple where an analog voltage indicates the temperature. The data interface 214 is configured and calibrated to communicate with the temperature sensors 228, 242.

The controller 218 is any processor, microprocessor, computer, or processor arrangement capable of running software for performing the functions described herein. The controller 218 communicates with the data interface 214, the communication interface 212 and the memory 216 such as an IC memory. Software code running on the controller 218 enables the functions described herein as well as facilitating the overall operation of the monitoring device 108.

A memory device 216 facilitates storage of data, setting information, identification information and other data. At least a portion of the memory 216 is non-volatile memory allowing data to be retained when power is unavailable.

A clock 248 provides time and date information to the controller 218. The clock 248 may be implemented as part of the controller 218 in some circumstances.

A user interface 246 provides a mechanism for the technician to exchange information with the monitoring device 108. An example of suitable user interface 246 includes a display and a keyboard. Other suitable user interfaces 246 include touch-screen displays and buttons as well as audio devices such as speakers and microphones. In some situations the user interface 246 may include mechanisms that allow the user interface 246 to be removed, locked or otherwise disabled to minimize tampering by unauthorized persons.

In the exemplary embodiment, the monitoring device 108 includes a data port 244 for connecting the data interface 214 to external equipment or possibly other sensors 110. The data port 244 is a connector suitable for transferring a data signal or other information to the data interface 214. An example of suitable data port 244 is a USB (Universal Serial Bus) connector or data ports conforming to IEEE standards. The data interface 214 includes the appropriate software and uses the protocols necessary to communicate using the data port 244.

The various functional blocks described with reference to FIG. 2 may be integrated, arranged and implemented in any of several configurations. Several of the functional blocks may be implemented or may be commercially available as a single device. In some circumstances, for example, a laptop computer may be used to implement one or more of the functional blocks of FIG. 2. The user interface 246, controller 218, memory 216, clock 248 as well as at least portions of the communication interface 212 and the data interface 214 may be implemented in the laptop computer.

Figure 3:
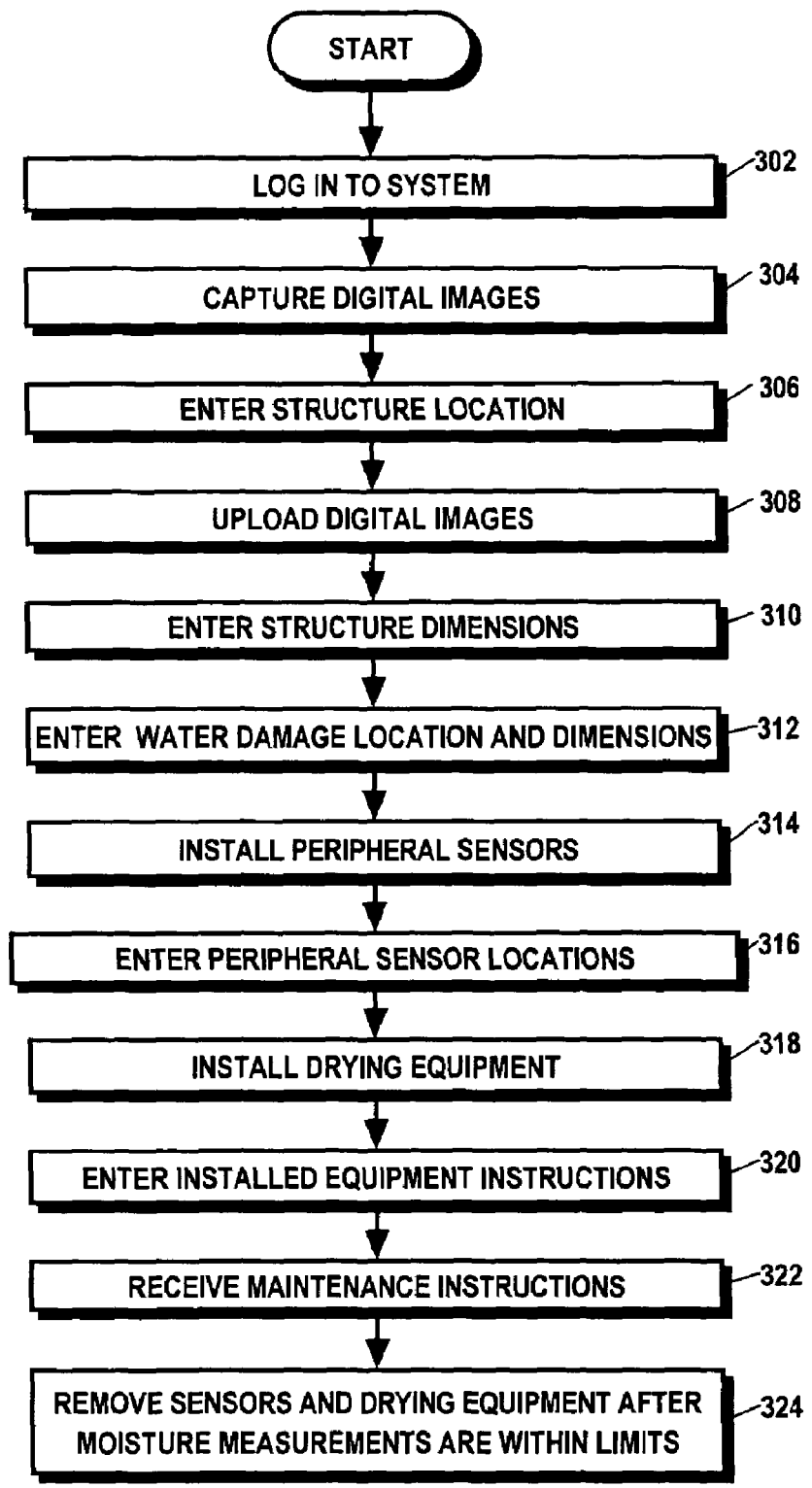
FIG. 3 is a flow chart of a method of installing and using the monitoring device and system for monitoring a drying procedure at a building structure in accordance with an exemplary embodiment of the invention.

FIG. 3 is a flow chart of an exemplary method of using the monitoring device 108 for performing a drying procedure. The particular method of using the monitoring device 108 depends on several factors such as the particular number and types of integral sensors 110 and peripheral sensors 110, the preferred drying procedure and other factors such as the number of rooms in the structure and the autonomy provided to the technician. For example, in the exemplary method, the technician connects a digital camera (not shown) to the data port to upload images to the server 204. Where the monitoring device 108 includes an integral camera (as in the second exemplary embodiment), the images may be captured and uploaded by the monitoring device 108 without the technician's intervention. The following method for using the monitoring device 108 provides an example and other methods may be used in some circumstances. Other drying procedures may omit or include additional steps. Further, the order of the steps may be changed depending on the particular situation.

At step 302, the technician initiates the procedure by providing authentication information to the monitoring device 108. In the exemplary embodiment, the technician enters an identification code using the user interface 246. In accordance with known techniques, the technician "logs in". The monitoring device 108 retrieves appropriate information and allows access based on the technician's information. In addition to establishing communication with the server 112, the initiation step launches a labor-time procedure which monitors and records labor hours for the particular technician. In some situations, structure location information is entered by the technician during the login procedure. In many situations, multiple technicians may login and logout at various times as they arrive at and depart from the drying procedure location 102. For example, where the building structure 106 has been flooded due to a plumbing leak, the first technician arriving at the building structure 106 will most likely be skilled as a plumber and will have expertise in detecting the source of the leak and repairing faulty plumbing. A drying procedure technician having expertise in proper drying procedures may arrive at a later time. The plumber may leave the location while the drying technician is still providing services. In this example, therefore, the plumber logs in, the drying technician logs in a short time later, the plumber logs out when the plumber's services are complete, and finally the drying technician logs out at time after the plumber has departed. The monitoring device 108 conveys the log in time and log out time of each technician allowing the server 112 to monitor and record the time spent at the drying location for each technician. Therefore, in the exemplary embodiment, drying procedure data includes the login and logout times of the technicians.

At step 304, the technician captures digital images by taking pictures of the exterior of the building structure 106 as well as of the damage of the structure caused by the excessive moisture. As explained above, a plumber may arrive prior to the drying technician in order to repair the leak. In such a circumstance the plumber may take digital pictures of the leak area prior to the repair. Further, the drying technician may take digital pictures of the damaged area both prior to and after exposing hidden damage areas such as under carpeting and within walls and ceilings. Accordingly, step 304 may be performed several times during the drying procedure by any number of technicians.

At step 306, the technician enters structure location information. The information may be added by typing the street address or by entering a location code that identifies the particular structure 306. In most situations, the first technician arriving at the structure will enter the street address into the monitoring device after logging in. In some situations, the information may be added by a later arriving technician after the first technician has logged in. This may be the case, for example, where a plumber arrives and may wish to avoid any interfacing with the monitoring device 108 until the leak is repaired in order to minimize water damage. In some situations, the monitoring device 108 compares the location information entered by the technician to the GPS data provided by the GPS receiver 226 and indicates an error to the technician if the GPS data in not in accordance with the entered location information. In other situations, the server 112 may compare the GPS data to the location information entered by the technician.

At step 308, the digital images are uploaded to the server 112. In the exemplary embodiment, the technician connects the digital camera to the data port 244 of the monitoring device 108 and follows an upload procedure. In some circumstances, the monitoring device 108 detects the presence of the digital camera and the digital images are automatically uploaded without further technician intervention. In many circumstances, however, the technician chooses the appropriate images to upload by entering the appropriate commands through the user interface 146. In the exemplary embodiment, GPS information associated with each photograph is uploaded with the digital images. Where GPS information is not available from the digital camera, the GPS data of the GPS receiver 226 is associated with each of the digital images before transmitting the digital images to the server 112. Therefore, each digital image includes information identifying the digital image by geographical location in the exemplary embodiment.

At step 310, the technician enters building structure 106 dimensions. In the exemplary embodiment, the technician measures the length and height of walls within the building structure 106 to provide the necessary information for calculating the volume of areas within the structure 106. The dimensions are entered using the user interface 246. In some circumstances, the technician enters textual information such as the name of the room or other notes. For example, the technician may enter "BEDROOM 1—includes 18 inch by 24 inch skylight" to identify the room and provide additional information that may be useful for determining the optimum drying procedure. Further, polar directional information may also be entered to provide orientation information. For example, information may be entered to indicate that a wall is a north wall of the building structure 106. In the exemplary embodiment, the building structure 106 dimensions are also utilized to generate images representing the walls, floors, and ceiling of the building structure 106 for drying procedure information 116 as well as for generating an interactive graphical user interface 246 for the technician to enter data.

At step 312, the water damage location and dimensions are entered into the monitoring device 108. The water damage location and dimensions may include a textual description of the water damage such as "North wall of Master Bedroom 90 inches long, 12 inches high". In some circumstances, the data is entered using curser to highlight water damaged areas on an illustration presented on the display of the user interface 246. The technician uses an input device such as mouse to click, drag, resize, and otherwise create a representation of the water damaged area. In the exemplary embodiment, the technician enters GPS coordinates to identify a particular damaged area. In some situations, the monitoring device may obtain some or all of the information related to the water damaged area through one or more sensors 110. For example, location information may include GPS coordinates and dimensions of the damaged area may be based on a photograph obtained with a camera.

At step 314, the technician installs the peripheral sensors 110. In the exemplary embodiment, the technician places and positions the peripheral sensors 110 in accordance with prudent moisture measuring techniques. Utilizing accepted standards for measuring moisture and at least partially relying on experience, the technician determines the most appropriate locations for the external sensors 110. In some circumstances, the server 112 calculates the preferred locations of all sensors 110 based on the data provided by technician and the monitoring device 108. In such circumstances, sensor 110 placement instructions are presented on a display of the user interface 246 to instruct the technician. An example of suitable format for presenting the sensor placement instructions includes an illustration of the building structure 110 indicating the appropriate locations for the external sensors 110 using icons or other representations.

At step 316, the technician enters the location of the peripheral sensors 110. In the exemplary embodiment, the technician uses a curser to indicate sensor 110 locations on a three dimensional illustration of the structure presented on the display of the user interface 246. A computer mouse or other input device is used to move a curser and select positions on the illustration representing the locations of the external sensors. Each sensor is identified by an identifier such as a number. Each external sensor 110 is also identified by a particular cable or connector to which it is connected. For example, several connectors of the monitoring device 108 may be numbered and the numbers identifying the peripheral sensors 110 match the numbers of the connectors.

At step 318, the technician installs the drying equipment. Based on the information entered by the technician and other data obtained through the monitoring device 108, the server 112 calculates the recommended drying equipment that should be installed and the recommended locations within the building structure 106 to position each piece of drying equipment. The technician applies prudent drying procedure practices to determine the appropriate locations and type of equipment and compares the information recommended by the server 112 to such a determination. In some situations, the actual drying equipment and locations chosen by the technician may differ from the recommended drying equipment type and placement. The reasons for using equipment other than the recommended equipment may be based on any number of factors such as the type of equipment immediately available to the technician, electrical power considerations, and technician preferences. Further, the technician may choose to place the drying equipment in locations other than the locations recommended by the server 112 do to prudent practices that are not considered by the server 112. Obstacles within the room limiting equipment placement, for example, may not be conveyed to the server 112 or may not otherwise be reflected in the building structure model representing the building structure 106.

At step 320, the technician enters the actual location and type of equipment installed in the structure. Where the server recommended equipment matches the actual equipment installed, the technician confirms the equipment installation. In situations where the installed drying equipment differs from the drying equipment recommended by the server, the technician enters information describing the drying equipment used and its location. In the exemplary embodiment, the technician uses the user interface 246 to indicate locations of the equipment on the structure model. An example of suitable method of entering the equipment type and location includes "click-and-dragging" icons representing different types of equipment to the locations within the three dimensional illustration representing the building structure 106. In some circumstances, only textual information is entered to indicate that certain equipment has been installed in a particular room within the building structure 106.

At step 322, the technician receives maintenance instructions indicating the recommended future actions to be taken. The instructions are presented though the display of the user interface 246 in the exemplary embodiment. The maintenance instructions may include textual information indicating any number of steps or measurements that are recommended or preferred. For example, the maintenance instructions may include a message such as "Return in 48 hours to confirm moisture level in North wall of Master Bedroom is less than 14% moisture." Further, in some circumstances the server 112 may calculate an estimated drying time based on the moisture levels, building structure dimensions and installed equipment. Estimated drying time may be displayed to the technician allowing the technician to determine if the configuration of installed equipment should be modified.

At step 324, the technician removes all equipment. The technician obtains several moisture measurements to verify that the structure is adequately dry and enters the values into the monitoring device 108 before turning off and removing all drying and monitoring equipment.

Figure 4:
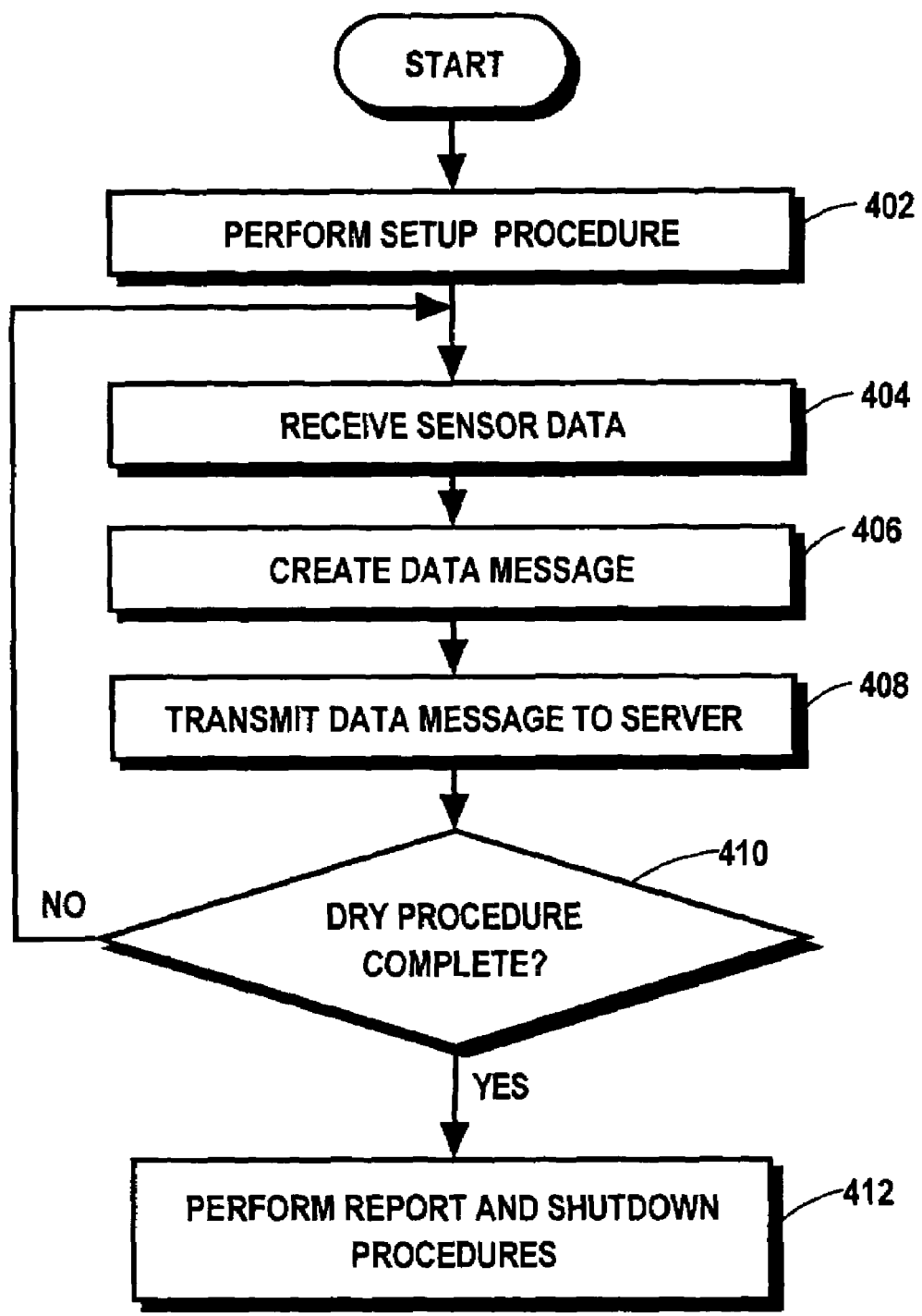
FIG. 4 is a flow chart of a method performed by the monitoring device of monitoring the drying procedure of the building structure in accordance with the exemplary embodiment of the invention.

FIG. 4 is a flow chart of a method of monitoring a drying procedure performed at the drying procedure site 102 in accordance with the exemplary embodiment of the invention. Although the monitoring method may be performed by any combination of hardware or devices, the method is performed by the monitoring device 108 installed at the drying procedure site 102 in the exemplary embodiment.

At step 402, the setup procedure is performed. During the setup procedure, the monitoring device 108 performs initialization procedures, establishes a communication link with the server 112 and conveys setup data to the server 112. An exemplary method of performing the setup procedure is discussed below with reference to FIG. 5.

At step 404, sensor data is received from the sensors 110. Data signals from the peripheral sensors 110 and integral sensors 110 are received at the data interface 214. The data interface performs any required translations or conversions to convert the data signals into sensor data. Where the data signals are analog signals, for example, the data interface 214 converts the analog signals into digital sensor data. Other processing may include translating a digital sensor signal into a different standard scale or range. The sensor data, therefore, includes digital values representing the various parameters measured by the sensors 110 where the digital values meet a format readable by the controller 218 in the exemplary embodiment.

At step 406, a data message is formed based on the sensor data. The controller 218 creates a data message based on the sensor data that conforms to a format that can be received by the communication interface 212. The sensor data from any number of sensors 110 is included in a single data message. The particular format of the data message depends on the communication interface, the number of sensors 110, the particular wireless communication system 202 and other factors that will readily be recognized by those skilled in the art based on these teachings as applied to known techniques.

At step 408, the data message is transmitted to the server 112. In the exemplary embodiment, the communication interface 212 formats the data message in accordance with the protocol of the wireless communication system 202 and transmits the message through the antenna 222. Radio frequency circuitry adequately amplifies the data message and transmits the data message through the wireless communication channel 220 to the wireless communication system 202. The data message is conveyed through the Internet 204 to the server 112. In some circumstances, the communication network 114 may include only a wired network 114 as explained above.

At step 410, the monitoring device 410 determines if the drying procedure is complete. If the drying procedure is complete the method continues at step 412. Otherwise, the method returns to step 404 where new sensor data is received. The method continually cycles through steps 404 to 408 to provide the server 112 with sensor data during the drying process. In some circumstances, sensor data may be received and stored for a particular time period before the data message containing the stored data is transmitted to the server 112. Accordingly, some of the steps of the exemplary method may be repeated or performed in any of several orders.

At step 412, a shutdown procedure is performed. The shutdown procedure may include any number of tasks and may be omitted in some circumstances. In the exemplary embodiment, however, a final report is generated and displayed to the technician. The final report may include information such as the total water removed, total drying time, and total electrical power used during the drying procedure. Final instructions to the technician may also be presented in some situations. After all final instructions and reports have been displayed, the monitoring device 108 terminates the communication link with the server 112 and powers down.

Figure 5:
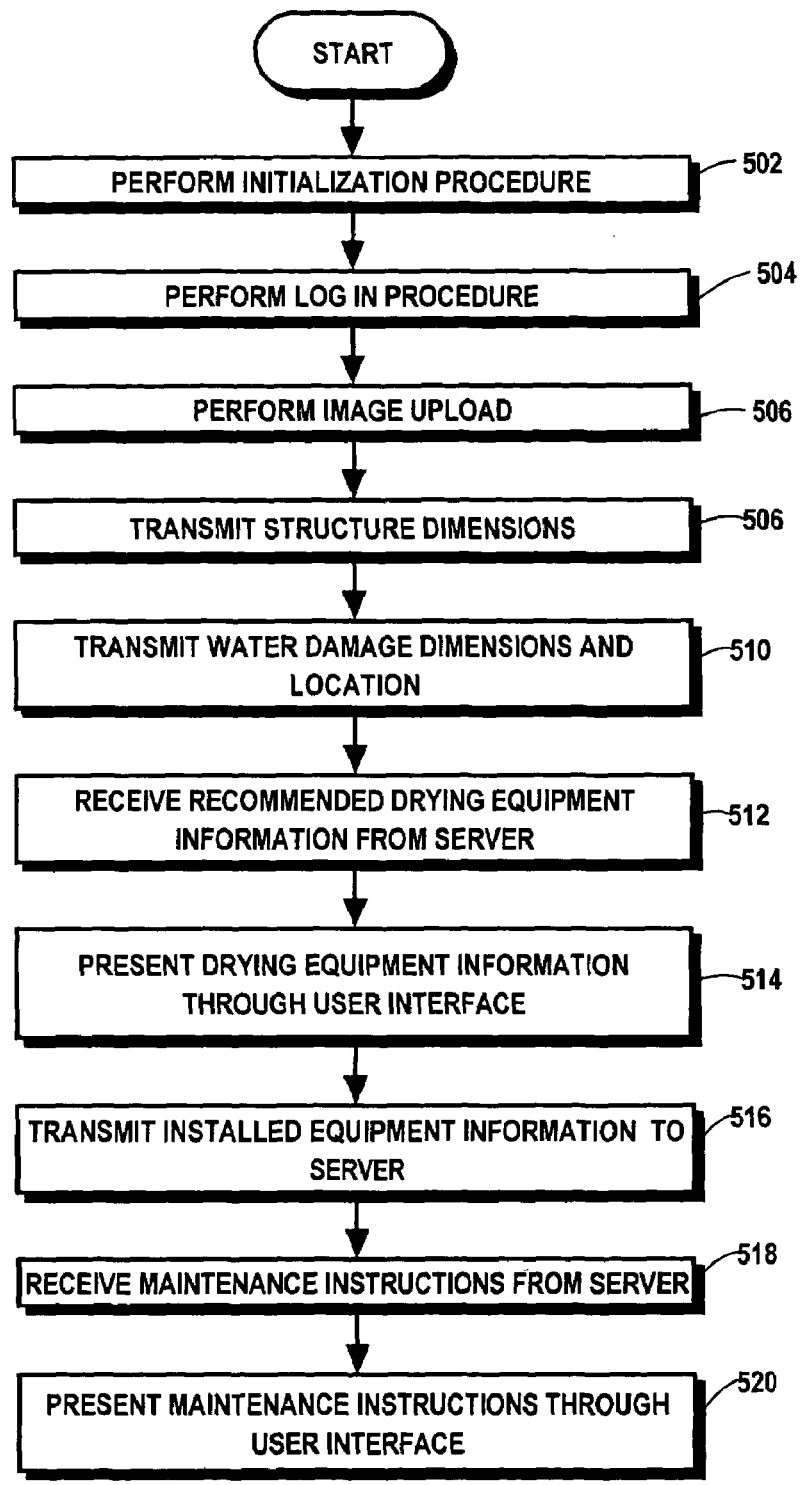
FIG. 5 is a flow chart of an exemplary method of performing a setup procedure.

FIG. 5 is a flow chart of an exemplary method of performing a setup procedure. The method described with reference to FIG. 5, therefore, provides an exemplary method of performing step 402 of FIG. 4 discussed above.

At step 502, the initialization procedure is performed. In addition to start-up diagnostics and self test procedures, the monitoring device 108 establishes a communication link through the communication network with the server 112 when the monitoring device 108 is turned on. As will be recognized by those skilled in the art, a variety of inquiry messages and acknowledgement messages may be exchanged during the initialization procedure. An identifier that uniquely identifies the particular monitoring device 108 is conveyed to the server 112. GPS coordinates obtained from the GPS receiver 226 and indicating the location of the monitoring device are transmitted to the server 112.

At step 504, a login procedure is performed. In the exemplary embodiment, the monitoring device 108 forwards authorization information entered by the technician to the server 112. In response to technician input, a login screen is presented through the user interface 246. The technician enters authentication information such as an identification name and password. The authentication information is transmitted to the server 112 through the communication network 114. The server 112 compares the authentication information to stored authentication information and allows access to the system 100 if the authentication information matches a valid record.

At step 506, the digital images are uploaded. In the exemplary embodiment, the software running on the controller 218 and the data interface 214 facilitates the upload process. The monitoring device 108 detects a digital camera connected to the data port 244 and initiates the process by communicating with the digital camera. The technician selects the digital images to upload using the user interface 246. The selected digital images are transmitted through the communication interface 212 in the appropriate format through the communication network 114 to the server 112. In the exemplary embodiment, the digital images include GPS coordinates associated with the digital image to indicate the location of the camera at the time the digital photograph was taken. Where the digital camera does not include a feature for including the GPS information, the GPS data provided by the GPS device 226 in the monitoring device 108 is associated with the digital images.

At step 508, the building structure dimensions are transmitted to the sever 112. The technician enters the building structure dimensions using a dimension entry screen displayed through the user interface 246 in the exemplary embodiment. The dimension entry screen includes graphical tools for indicating relative position of walls of the structure. The heights and widths of walls are entered using the keyboard. The dimensions and relative positions of the walls in the structure are formatted and transmitted to the server 112 through the communication network 114.

At step 510, the dimensions of water damaged areas are transmitted to the server 112. In the exemplary embodiment, the technician determines the dimensions of areas on walls, floors, and ceilings having higher than acceptable moisture content using a hand held moisture meter. The dimensions are entered using a water damage entry screen presented through the user interface 246. The water damage entry screen includes a perspective view illustration of the building structure 106. The technician, using an input device such a computer mouse, indicates the excessively wet areas on the illustrated walls, floors and ceilings. The information entered is transmitted to the server 112 through the communication network 114.

At step 512, the recommended drying equipment information is received from the server 112. As explained below in further detail, the server 112 determines the drying equipment that will most efficiently dry the building structure 106 based on the data provided by the technician and based on recognized standard drying procedure protocol.

At step 514, the recommend drying equipment information is presented on the display of the user interface 246. In the exemplary embodiment, a listing of the recommend equipment and an illustration of the building structure 106 with icons representing the equipment are displayed.

At step 516, the installed equipment information entered by the technician is transmitted to the server 112. The installed equipment information describes the type and location of drying equipment that is actually installed in the structure. In some situations the technician verifies that the installed equipment information matches the recommended equipment information. Otherwise, the technician enters the installed equipment information through the user interface 246. The installed equipment information is formatted and transmitted to the server 112 through the communication network 114.

At step 518, the monitoring device 108 receives maintenance instructions from the server 112. In the exemplary embodiment, messages are transmitted from the server 112 to the monitoring device 108 through the communication network 114 in accordance with internet protocol. The messages are deciphered in accordance with known techniques and the teachings herein.

At step 520, the maintenance instructions are presented through the user interface 246. In the exemplary embodiment, the instructions are presented in text and provide information relating to the recommended procedure the technician should follow to complete the drying procedure.

Any number of steps of the setup procedure may be performed during other times of drying procedure. For example, the login procedure at step 504 is performed at any time a drying technician arrives at the structure. Therefore, the method described with reference to FIG. 5 provides one example of a suitable method for performing the setup procedure. Other procedures for establishing communications, authenticating technicians and communicating with the technicians and the monitoring device 108 and performing the setup procedure may be performed with other steps, techniques and methods.

Figure 6:
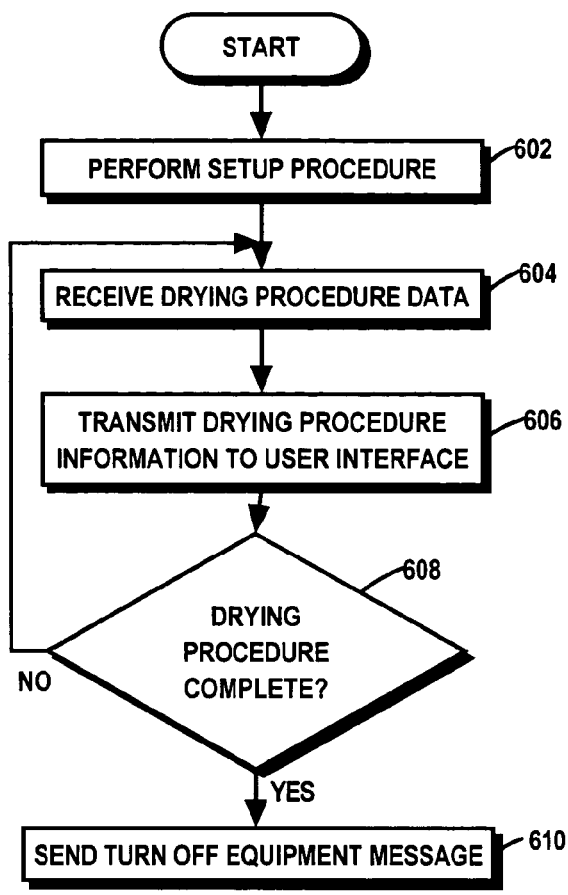
FIG. 6 is a flow chart of a method performed by the server of monitoring the drying procedure in accordance with the exemplary embodiment of the invention.

FIG. 6 is a flow chart of a method of drying procedure monitoring performed at a server 112 in accordance with the exemplary embodiment of the invention. The drying procedure monitoring method may be performed by any combination of hardware, software, and firmware and may be performed by a single device or by multiple devices. In the exemplary embodiment the method is performed by software code running on the server 112 that includes a memory media and a processor that is configured to execute software code to perform the method described herein.

At step 602, the setup procedure is performed. The server 112 exchanges data, and messages with the monitoring device 108 through the communication network 114 to perform initialization procedures, establish a communication link with the server 112 and receive setup data to the server 112. As discussed above, login procedures such as authentication and authorization are performed to identify drying procedure technicians. Further, setup data is received from the monitoring device 108 and stored in memory where the setup data may include digital images of the building structure 106 and damaged areas, structure dimensions and layout, damage location and dimensions, initial moisture levels, structure identification such as a street address or GPS coordinates, and number and type of active sensors. Based on these teachings, those skilled in the art will recognize the other types of setup data that can be received and stored at the server 112 in some situations.

At step 604, the server 112 receives the drying procedure data. As discussed in further detail below with reference to FIG. 7, the server receives a data message including the drying procedure data in the exemplary embodiment. The drying procedure data may include any combination of character strings, numbers, symbols, values, or electronic files that represent one or more parameters, characterizations, identifiers, or descriptions related to the drying procedure performed at the building structure 106. Examples of drying procedure data include sensor measurements, technician entered data, environmental conditions at or near the structure location, and data generated by monitoring device 108. In some circumstances, some information may be received from sources other than the monitoring device 108. For example, temperature, humidity, and wind speed data may be obtained from weather service such as web site providing weather information. The information may be used to perform calculations where some data may not be available directly from the drying procedure site or may be used to supplement the information obtained from the site.

At step 606, drying procedure information 116 based on the drying procedure data is transmitted to the user interface 104. As discussed in further detail below with reference to FIG. 8, the drying procedure information 116 is transmitted to the user interface 104 through the communication network 114 in response to a request received from the user interface 104 in the exemplary embodiment. Using the drying procedure data received from the monitoring device 108, the server 112 creates the drying procedure information 116 by calculation or other processing and generates a message including the drying procedure information 116. The drying procedure information 116 is presented through the user interface 104 and may include any combination of text, numbers, graphs, photographs, tables, multimedia, video, and audio.

At step 608, the server 112 determines if the drying procedure is complete. In the exemplary embodiment, the server 112 determines if moisture measurements within the structure meet the maximum allowable limits suggested by the IICRC (Institute of Inspection, Cleaning and Restoration Certification) Standard and Reference Guide for Professional Water Damage Restoration provided by the Water Damage Restoration Standard Task Force. If the moisture levels are below the suggested limits, the server 112 determines that the drying procedure is complete. If the drying procedure is complete, the method continues at step 610. Otherwise, the method returns to step 604 to continue the monitoring process. Other methods may be used to determine if the drying procedure is complete. In some situations, for example, the server 112 may determine that the procedure is complete based on the time the drying equipment has been in operation and a maximum time limited entered by the technician.

At step 610, the server 112 transmits a message indicating that the drying equipment should be turned off. The message is transmitted through the communication network 114 to the monitoring device 108. The message is presented through the monitoring device user interface 246.

Figure 7:
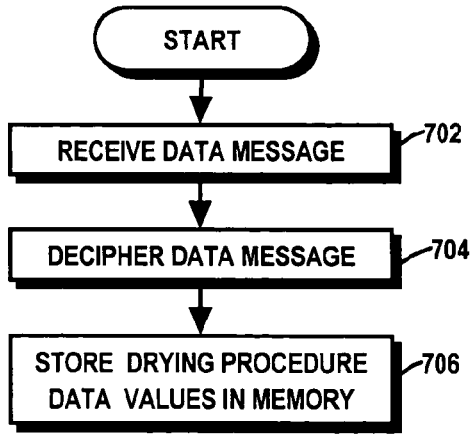
FIG. 7 is a flow chart of an exemplary method of performing of receiving drying procedure data.

FIG. 7 is a flow chart of an exemplary method of receiving the drying procedure data. The steps discussed with reference to FIG. 7, therefore provide an exemplary method for performing step 604 of FIG. 6.

At step 702, a data message is received through the communication network 114. As discussed above, the data message is generated and transmitted in accordance with the protocol of the wireless communication system 202 in the exemplary embodiment. The data message represents the drying procedure data acquired at the building structure 106 and may include representations of moisture levels, humidity, temperature, power, time, dimensions, GPS coordinates, or any other data related to a characterization, quantization, or description of the drying procedure. Further the data message may include data entered by technicians. An example of a suitable technique for receiving the data message includes receiving a HTTP message in accordance with Internet Protocol techniques communication through wireless communication network.

At step 704, the data message is deciphered to extract the drying procedure data. The server 112 parses and processes the data message to obtain values, text, or other representations of the drying procedure data. In accordance with the particular message protocol, the values and other information are identified and extracted. Where the data message is an HTTP message, the server 112 utilizes well known IP and HTTP techniques to receive the drying procedure data.

At step 706, the drying procedure data is stored in memory. The values, text, and other representations of the drying procedure data are indexed and stored to retain the correlation with other parameters and values. For example, moisture levels measured by a moisture sensor 230 are associated with the particular moisture sensor 230 and location within the structure. Each parameter or value representing drying procedure data may be correlated, cross-correlated, or associated with any number of other drying procedure data values.

Figure 8:
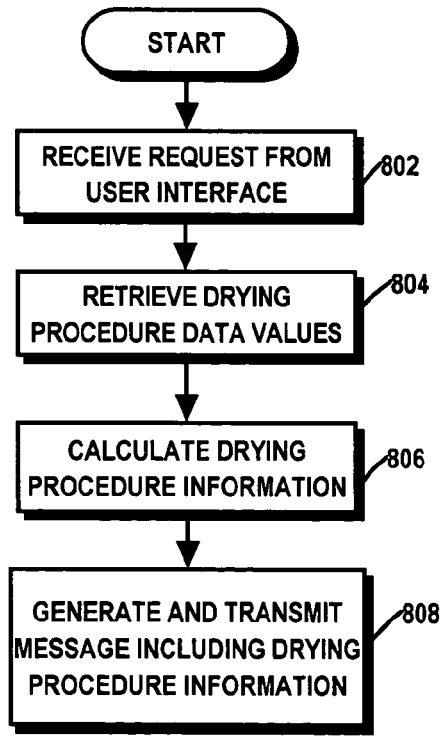
FIG. 8 is a flow chart of an exemplary method of transmitting drying procedure information to the user interface.

FIG. 8 is a flow chart of a method of transmitting drying procedure information to the user interface in accordance with the exemplary embodiment of the invention. The method discussed with reference to FIG. 8, therefore, is an exemplary method of performing step 606 of FIG. 6.

At step 802, a request is received from the user interface. In the exemplary embodiment, the request is an HTTP message submitted through a Web browser application running at the user interface 104. An example of a suitable technique for initiating the HTTP message includes entering commands through a keyboard or mouse. After logging-in, the user navigates to the appropriate web page and selects the desired drying procedure information 116 by, for example, clicking on a radio button representing the particular drying procedure information 116. An HTTP message is generated and transmitted to the server 112 in accordance with known techniques based on the particular selection. In some circumstances, the user may submit several messages prior to specifying particular drying procedure information 116. For example, the user may submit information identifying the particular drying procedure project, a specific location within the building structure 106 and other information before submitting a specific request for drying procedure information 116 associated with the entered criteria. Further, the user may specify the preferred presentation format and may specify, for example, a text, tabular, or graphical and orientation of a graph and graph scale. The user interface pages and options are discussed in further detail below with reference to FIG. 11. The HTTP message defining the request for the drying procedure information 116 is transmitted in accordance with IP and HTTP protocol to the server 112 through the communication network 114 and received by the server 112 in the exemplary embodiment.

At step 804, the server 112 retrieves drying procedure data values from memory. Based on the particular request received from the user interface 104, the appropriate values, parameters, text, symbols, and images are retrieved from non-volatile memory.

A step 806, the drying procedure information 116 is calculated using the retrieved drying procedure data. The complexity of the calculation and the number and types of drying procedure data that are used in the calculation depend on the particular drying procedure information 116 that is generated. In some circumstances, the calculation includes applying values to a mathematical formula. Examples of drying procedure information calculated using mathematical formulas include estimate total drying procedure cost, estimated equipment cost, estimated labor cost, accrued total drying procedure cost, accrued equipment cost, accrued labor cost, estimated drying time, accrued drying time, estimated drying procedure cost per gallon evacuated water, accrued drying procedure cost per gallon evacuated water, estimated power, and accrued power. In some circumstances, the drying procedure data is forwarded, reformatted or translated into drying procedure information 116. For example, digital images or log files may be minimally processed to place the file or digital image in a condition to transmit to the user interface 104. Other examples include values or text that are forwarded to the user interface 104 with minimal manipulation such as moisture values, temperature values, start times, location descriptions and location coordinates for the structure and damaged areas and humidity values. The generation of the drying procedure information may require multiple data manipulation, calculation, estimation, and interpretation and may be performed by specific drying procedure information engines invoked by the monitoring process. For example, a three dimensional graphical representation of the structure may require one or more programs, subroutines, or other software code to generate information that can be interpreted by the user interface 104 to display the three dimensional representation. Models to allow a virtual "walk-through" by the user using the user interface 104 may require relatively extensive calculation and data manipulation to create the models and computer readable files representing those models. Accordingly, the drying procedure information 116 generated from the drying procedure data may include any of numerous formats and may include a variety of information. The drying procedure information 116 generated in the exemplary embodiment is discussed in further detail below. In some circumstances, calculations may be performed prior to a request received from the user interface 104 and the resulting values stored in memory for later retrieval.

At step 808, a message including the drying procedure information 116 is generated and transmitted to the user interface 104. In the exemplary embodiment, the message is generated and transmitted in accordance with a markup language compatible with the Internet. An example of a suitable markup language includes HTML (Hypertext Markup Language). Other types of formats and protocols can be used such as, for example, techniques in accordance XML (extensive Markup Language). The message is formatted to include the drying procedure information 116 and transmitted through the Internet to the user interface 104.

In the exemplary embodiment, therefore, drying procedure data related to a drying procedure performed at a building structure 106 is collected and transmitted by a monitoring device 108 located at the building structure 106 through a communication network 114 to the server 112. The server 112 stores the values, symbols, text and other drying procedure data in memory. A user that is logged into the server 112 accesses the drying procedure information 116 by navigating and submitting commands through a series of Web page using Web browser software running on the user interface 104. The drying procedure information 116 may be displayed in a variety of formats and may include any of several calculated, forwarded, or otherwise generated values or images. The following includes a brief description of the drying procedure information 116 than may be generated in the exemplary embodiment. In some circumstances, information may be eliminated, added or combined to provide the drying procedure information 116.

Digital Images.

Digital images uploaded from the monitoring device 108 are stored in an appropriate format. Examples of some of the numerous suitable formats include the TIFF (Tagged Image File Format), BMP (Bitmapped format), GIF (Graphics Interchange Format), JPEG (Joint Photographic Experts Group), PDF (Portable Document Format) and the PCX (Graphics File Format). The digital images may include photographs of the exterior and interior of the building structure 106 as well as photographs of damaged areas within the building structure 106. In the exemplary embodiment, the images are forwarded to the user interface 104 upon request and include superimposed indicia or other markings indicating identification, time, date and location information. For example, images of the water damaged areas within the building structure 106 include the structure address, GPS location, time and date the image was captured and room name. Other information, such as textual notes entered by the technician may also be displayed with the digital image in some circumstances.

Specific Instantaneous Values.

Current values and measurements such as indoor temperature, outdoor temperature, indoor humidity, outdoor humidity, moisture measurements of structure components, times, dates, GPS coordinates, current power consumption and other values transmitted to the 112 server from the monitoring device 108 are properly formatted and forward to the user interface 104. The specific instantaneous values, therefore, indicate in real time, or in near real time, the environmental and equipment conditions within the building structure 106.

Estimated Values.

Estimated values may include any of numerous values related to the drying procedure that are based on entered, measured, and stored parameters. The drying procedure data is used to calculate and determine an estimated rate, estimated total, and estimated daily values for drying time, water removal, total cost, labor cost, equipment cost, and consumed power in the exemplary embodiment. Those skilled in the art will recognize the other estimated values that may be generated based on known techniques as applied to the teachings herein.

Resulting Values.

The actual values resulting from the drying procedure are calculated from the drying procedure data and include resulting total, resulting daily total resulting daily average, and resulting rate for drying time, water removal, drying procedure cost, labor cost, equipment cost, and consumed power. In addition, a cost per gallon of removed water is calculated by dividing the total cost of the drying procedure by the total number of gallons removed from the structure or room. Other resulting values may be provided in some circumstances.

Graphs And Tables.

The values discussed above may be combined or related to provide any number of graphical or tabular presentations including line graphs (frequency polygon), a histograms (bar chart) and tables. Examples of other suitable graphical formats include pie charts and Venn diagrams. The visual presentations supported by the drying procedure monitoring procedure depend at least partially on the particular implementation, the anticipated needs of the users, cost, system bandwidth, processing power, and the types and number of sensors located at the structure. In the exemplary embodiment, bar graphs (histograms) showing the following relationships are selectable by the user: daily moisture levels for each moisture sensor; daily humidity levels relative to target humidity; daily labor costs; daily equipment costs, and daily total drying costs. Further, line graphs showing the following relationships are selectable by the user in the exemplary embodiment: interior temperature and specific humidity vs. time; and exterior temperature and specific humidity vs. time. Further, in implementations where an air quality sensor is installed, a graph showing the daily air quality is selectable by the user.

Generated Graphical Representations.

In the exemplary embodiment, the drying procedure data entered by the technician, as well as data collected by the sensors, are utilized to render a graphical representation of the building structure 106. The room dimensions and, in some cases, photographs, are used to generate a visual model representing a three dimensional virtual building structure accessible by the user through the user interface 104. The user navigates the model using a mouse, joystick, or other input device to engage in a virtual "walk-through" of the building structure 106. Moisture data is represented in the model using color or shading. For example, wet sections on wall, ceiling and floors having a moisture level higher than a maximum base level are represented as blue shapes on the virtual walls, ceilings and floors of the model. Where moisture sensor data is limited, approximations and interpolations are used to generate a blue shape representing a probable moisture pattern. In the exemplary embodiment, a virtual three-dimensional generation engine implemented in accordance with known techniques utilizes the building structure dimensions and moisture sensor measurements to create the virtual structure with moisture information.

In addition to three dimensional models, two dimensional representations including maps and structure schematics are selectable by the user in the exemplary embodiment. Maps indicate the location, address, and GPS coordinates of the building structure 106. Further, each piece of drying equipment is tracked on a map and schematic using icons indicating their location. GPS data that is either entered by a technician or provided by a GPS device connected to the equipment is received from the monitoring device 108 and used to position an icon when generating the map or schematic. Water damaged areas are also indicated on the schematic in the exemplary embodiment and may include textual notes entered by the technician.

In the exemplary embodiment, the calculations discussed above are performed in accordance with known techniques and mathematical formulas and in accordance with the industry practices and guidelines. Such guidelines are presented in industry agencies reference guides such as the IICRC (Institute of Inspection, Cleaning and Restoration Certification) Standard and Reference Guide for Professional Water Damage Restoration provided by the Water Damage Restoration Standard Task Force. Those skilled in the art will readily recognize the required equations, mathematical formulas, and techniques for determining and generating drying procedure information 116 based on the teachings herein.

Those skilled in the art will readily recognize the various modifications and combinations of the presentations discussed above and the techniques that can be applied to provide the drying procedure information 116 based on these teachings. Other navigation and presentation techniques and mechanisms can be applied to the user interface 104 in some circumstances. Hyper links, for example, may be implemented in some situations to provide the user with an efficient method of navigating through the numerous graphs, maps, schematics and other presentations. Further, the drying procedure information 116 may be presented in other formats and may include an audio format in addition to or in place of any of the visual presentations discussed.

As discussed above, the user interface 104 includes web browser software in communication with the server 112 through the Internet 204 in the exemplary embodiment. In accordance with known techniques, web pages are received and displayed to the user in response to input entered through an input device such as a keyboard of mouse.

Figure 9:
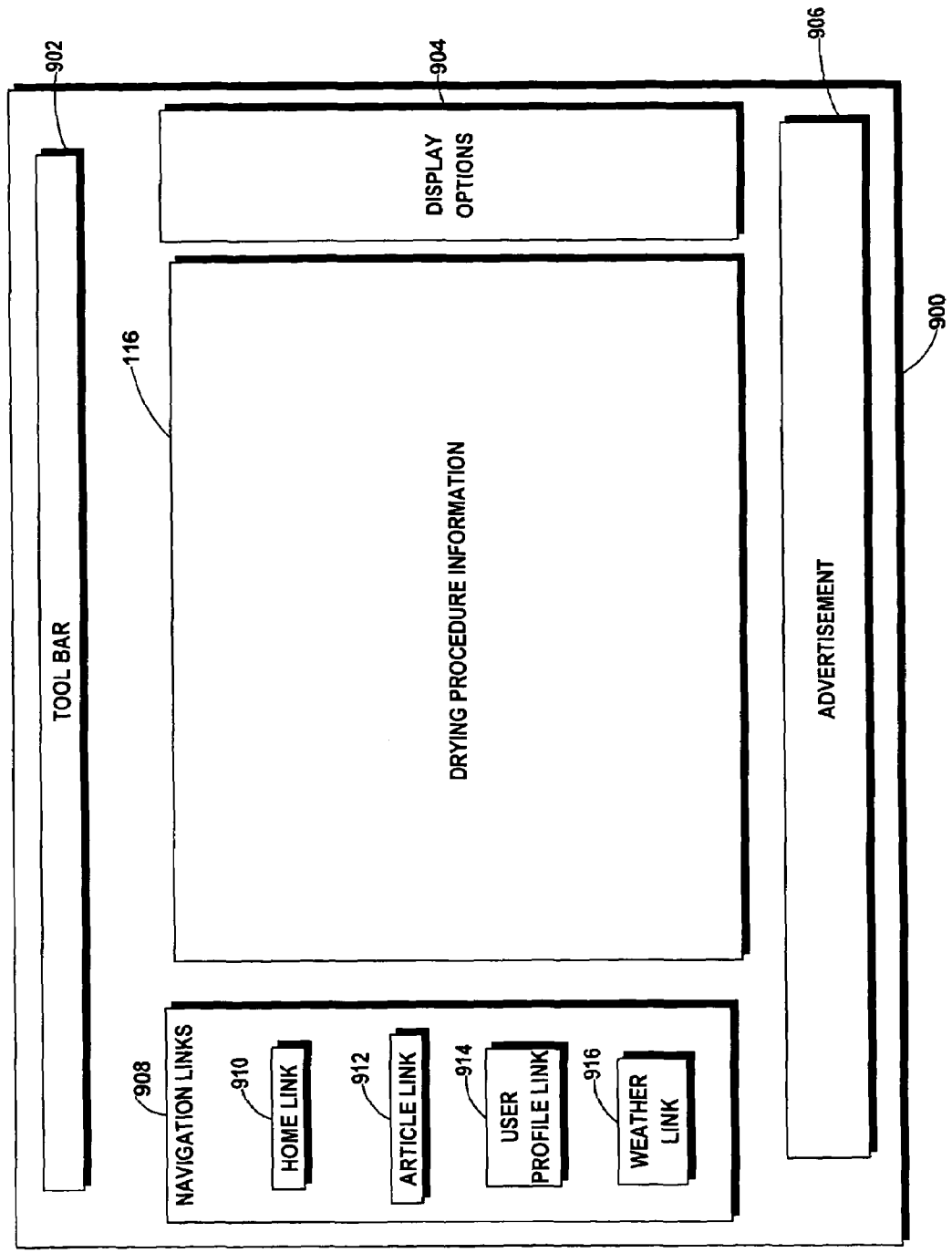
FIG. 9 is a block diagram of an exemplary user interface.

FIG. 9 is a block diagram of an exemplary user interface web page 900 displayed through the user interface 104 and including drying procedure information 116. In the exemplary embodiment, web browser software running on the personal computer of the user interface 104 receives and processes HTML messages to provide the user interface web page 900 to the home owner, insurance representative, drying procedure contractor or other user. The HTML messages result in images, graphs, tables, text, and other graphics to be displayed on a visual display such as a computer monitor. In some circumstances sounds may be presented through speakers based on the HTML messages. The blocks illustrated in FIG. 9 represent interactive and non-interactive images displayed by the web browser software. Each block, therefore, may represent text, graphics, images, hypertext links, buttons, or other features in accordance with known web browser techniques. The blocks as illustrated in FIG. 9 do not necessarily depict relative positions, sizes, or shapes of the items displayed and the visual display of the blocks may include a variety of shapes, sizes, colors and relative positions. Further, additional features may be included and the represented items may be omitted or modified depending on the particular implementation and situation.

The user interface web page 900 includes at least drying procedure information which may be in any of several forms or formats as discussed above. In the exemplary embodiment, the drying procedure information is displayed in one of three formats based on the user's preference. Display options 904 allow the user to select a line graph format (frequency polygon), a histogram format (bar chart) or a tabular format. Examples of other suitable formats include textual formats, word-processing and spreadsheet formats, audio formats and other graphical formats such as pies charts and Venn diagrams.

The drying procedure information 116 may depict the "raw" data entered by the technician or captured by the sensors 110 or may depict a relationship within the drying procedure data. The drying procedure information 116 may illustrate any of numerous relationships such as relationships between the various drying procedure data values and other drying procedure data values and relationships of the drying procedure data values over time. The user selects any of several relationships using the tool bar 902 and, in the exemplary embodiment, may select drying procedure information 116 illustrating relationships of original and calculated drying procedure data values over time and the relationships between the various original and calculated drying procedure data values. The particular drying procedure information presentations, graphs, and illustrations may convey any of numerous relationships and the particular options available to a user will depend on factors such as system resources, system provider preferences and user preferences. Those skilled in the art will recognize the various additional relationships and displays of drying procedure information 116 based on these teachings and known techniques.

The user interface web page 900 includes navigation links 908 in the exemplary embodiment. Examples of links that may be included on the user interface web page 900 include a home link 910, an article link 912, user profile link 914, and weather link 916. The user may access the home page of the drying procedure service provider or other service provider by selecting the home link 910. Pages containing articles or other useful information and statistics are available by selecting the article link 912. The weather link 916 provides a connection to an online weather service. Further, when the user selects the user profile link 914, the user is directed to a user profile page where administrative and other user specific preferences may be selected or modified. The user, for example, may change authentication information such as a password using the user profile page.

Further, the user interface web page 900 may include one or more advertisements 906 in some circumstances. The advertisements 906 presents targeted drying procedure related advertising to individuals interested in drying procedure products and services. Advertisements 906 may not be appropriate in all implementations and, where included, may allow the drying procedure service provider to derive additional revenue. One or more of the sections with the user interface 900 may not be available to some users. For example, advertising targeted to drying procedure technicians and professionals may only be available to contractor users and not to home owners or insurance representatives.

The exemplary user interface web page 900 may be one of several user interface pages depending on the particular implementation where each page may include particular information or interactive screens for exchanging information with the server 112. Some or all of the objects discussed with reference to FIG. 9 may be omitted in other pages or additional objects may be included. The particular configuration of the user interface pages therefore, will vary with the particular needs of the service providers and users.

Figure 10:
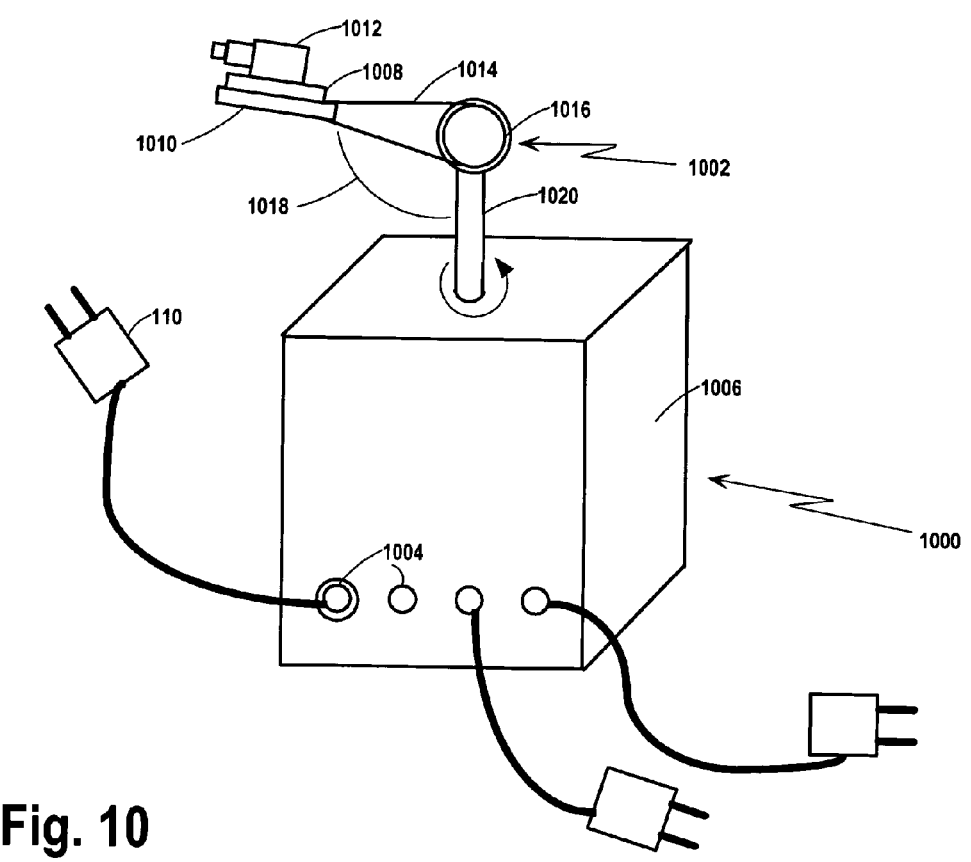
FIG. 10 is a block diagram of a perspective view of a monitoring device in accordance with a second exemplary embodiment of the invention where the monitoring device includes a scanning mechanism.

FIG. 10 is a block diagram of a perspective view of a monitoring device 1000 in accordance with a second exemplary embodiment of the invention that includes a scanning mechanism 1002. Although the monitoring device 1000 may include only integral sensors, a plurality of connectors 1004 allows connection to external sensors 110 in the second exemplary embodiment. The monitoring device 1000 may be implemented over several devices, hardware and software. In the exemplary embodiment, however, the monitoring device 10000 is implemented in a single unit having a housing 1006, several connectors 1002, a non-penetrating moisture sensor (scanning moisture sensor) 1008, a distance sensor 1010, and a digital camera 1012. The scanning moisture sensor 1008, the distance sensor 1010 and the digital camera 1012 form a scanning assembly 1022 and are mounted on a rotating arm 1014. The rotating arm 1014 is activated by a motorized mechanism that is controlled by the controller 218 and allows the arm 1014 to rotate a full 360 degrees. The rotating arm 1014 includes an elbow 1016 allowing an angle 1018 of the arm to be adjusted from a few degrees to 180 degrees from a rotating axle 1020. At an angle of 180 degrees, the scanning sensors 1008, 1010, 1012 are positioned to point at the ceiling directly above the monitoring device 1000 when the monitoring device 1000 is placed on the floor.

In the second exemplary embodiment, the non-penetrating remote moisture sensor 1008 is a thermal scanning device that remotely identifies temperature differences. Thermal scanners provide a representation of temperatures on a surface of an object that can be correlated to moisture content of the object. Accordingly, an image representing the moisture content of wall, ceiling or floor can be obtained by scanning the target area with the thermal scanning device.

The motorized mechanism is any hardware, device, or arrangement of devices that moves the scanning assembly 1022 in the intended pan and tilt directions. Any of variety of mechanisms can be used in accordance with known techniques. For example, the motorized mechanism may be implemented in accordance with surveillance camera mechanism techniques.

In the second exemplary embodiment, the monitoring device 1000 performs monitoring functions as described with reference to the first exemplary embodiment. In some circumstances, the monitoring device 1000 may be integrated with other equipment such as drying equipment. The monitoring device 1000 may be housed within the same housing 1006 as a dehumidifier or may be detachably connected to a dehumidifier adapted to accept and connect to the monitoring device 1000. Further, the monitoring device 1000 may comprise several modules that are communicatively coupled through wired or wireless communication links. For example, the monitoring device 1000 may include a laptop computer and a wireless modem, where the laptop computer includes the controller 218, the data interface 214, and the user interface 246 and where the wireless modem includes the communication interface 212. At least one sensor is connected to the laptop through a serial port, Universal Serial Bus (USB) port or other connector. Software running on the laptop facilitates the functions of the controller 218 as described herein. Another example includes having a detachable module connected to a main housing where the detachable module includes the user interface 246. Other variations and combinations will readily occur to those skilled in the art based on these teachings and known techniques.

Figure 11:
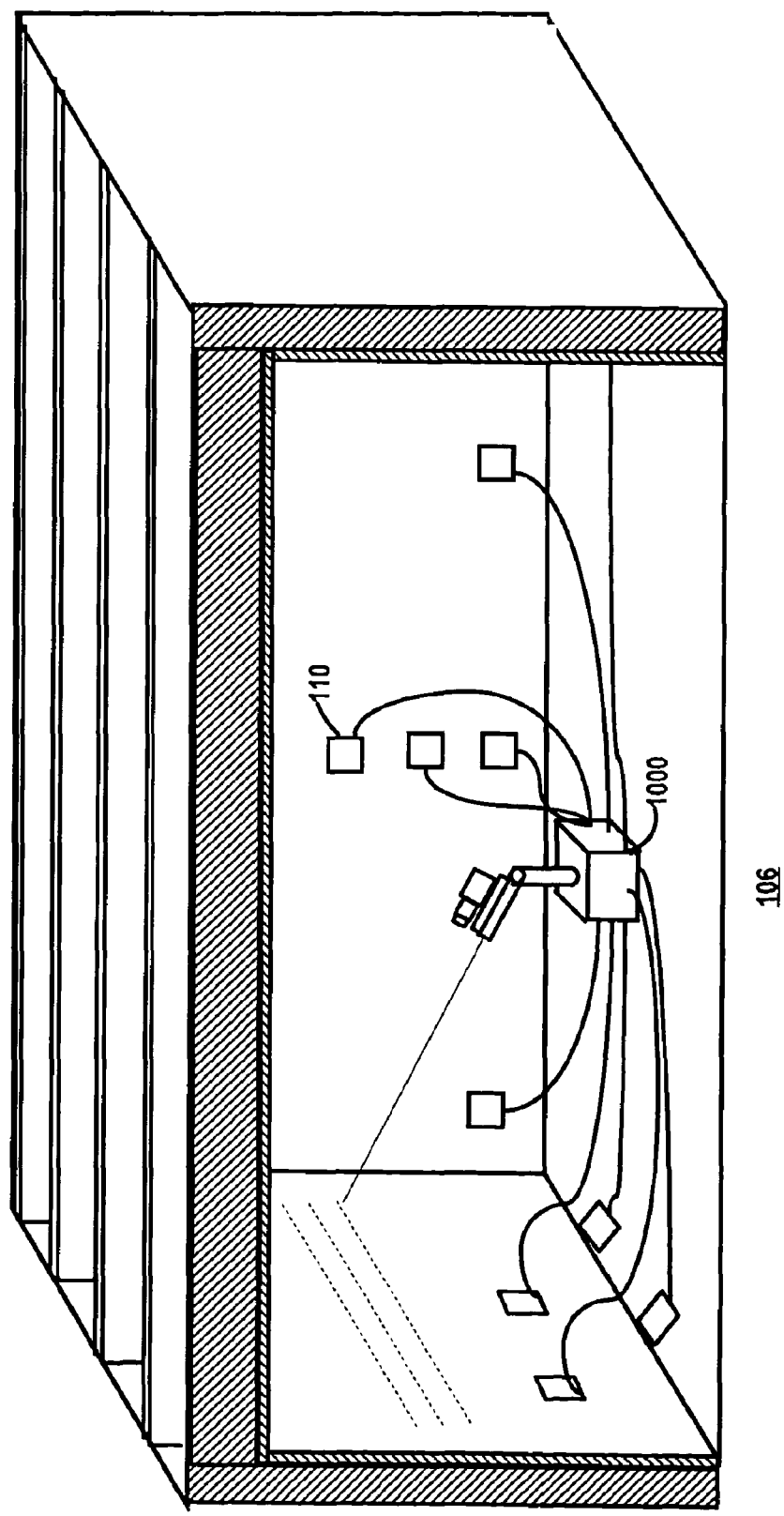
FIG. 11 is an illustration of a perspective sectional view of a building structure in accordance with the second exemplary embodiment of the invention.

FIG. 11 is an illustration of a cross sectional perspective view of a room within structure 106 with the monitoring device 100 installed prior to the installation of drying equipment. An exemplary configuration is shown in FIG. 11 where several peripheral sensors 110 are connected to the monitoring device through cables. The monitoring device 1000 continually scans the room to obtain temperature and moisture measurements. Digital images of the building structure 106 are initially obtained and at periodic intervals during the drying procedure. The distance sensor 1010 obtains room dimensions during the set up procedure.

The exemplary embodiments, therefore, provide a system, apparatus and method for monitoring a drying procedure of a building structure 106. Drying procedure information 116 is accessed by users through the Internet using web browser software running on a personal computer or other workstation. The system 100 allows insurance providers to efficiently monitor the drying procedure of water damage claims where the contractor has installed the system 100 and provided access to the insurance providers. The use of proper drying procedures can be verified by home owners, insurance provider personnel and contractors. The system 100 can be integrated into a comprehensive water damage reconstruction program where damage claims are easily adjusted and approved. Unscrupulous and fraudulent practices are minimized while restoration guidelines can be easily followed and verified. Damage from excessive drying is minimized. Further, complications resulting from under drying such as mold and fungus growth are also minimized. Contractors may track equipment and employees further minimizing inefficient use of resources and loss or theft of equipment.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

What is claimed is:

1. A method for managing a drying procedure, the drying procedure performed at a building structure after exposure to water, the method comprising:

receiving, at a server through a communication network, drying procedure data obtained by one or more sensors at the building structure undergoing the drying procedure to remove moisture from at least a portion of a building material forming at least a portion of the building structure;

generating, by the server, first drying procedure information regarding the drying procedure based on the drying procedure data and a first access authorization level, at least a portion of the first drying procedure information being different from any portion of the drying procedure data, the first drying procedure information comprising at least one of timing information, moisture information, humidity information, temperature information, electrical power information, voltage information, current information, cost information, image information, thermal image information, audio information, and equipment information;

generating, by the server, second drying procedure information based on the drying procedure data and a second access authorization level, the second drying procedure information being different from the first drying procedure information and comprising at least one of timing information, moisture information, humidity information, temperature information, electrical power information, voltage information, current information, cost information, image information, thermal image information, audio information, and equipment information;

transmitting, by the server to a first user interface, the first drying procedure information;

receiving, at the server, a control instruction from the first user interface, the first user interface having the first access authorization level;

transmitting the control instruction through the communication network to equipment at the building structure; and transmitting, by the server the second drying procedure through the communication network to a second user interface having the second access authorization level, the second user interface being restricted, based on the second access authorization level, from transmitting any control instructions for controlling the equipment.

2. The method of claim 1, further comprising:
transmitting the first drying procedure information to the first user interface through the communication network.

3. The method of claim 2, wherein the drying procedure data comprises moisture data indicating a moisture level of the at least the portion of the building material.

4. The method of claim 1, wherein the drying procedure data comprises at least one of a temperature at the building structure, an indoor humidity level at the building structure, an outdoor humidity level at the building structure, and a dissipated power value indicating power dissipated by the equipment.

5. The method of claim 1, wherein the control instruction comprises a command to configure drying equipment.

6. The method of claim 1, wherein the control instruction comprises a command to configure a drying monitor device obtaining the drying procedure data.

7. The method of claim 1, wherein the transmitting the control instruction comprises transmitting the control instruction through a packet switched network.

8. The method of claim 7, wherein the packet switched network is an Internet.

9. The method of claim 1, wherein the building material is selected from the group consisting of wood, plywood, drywall, brick, concrete, pressboard, plaster, carpet, and insulation.

10. The method of claim 1, further comprising:
providing an estimated drying time for the drying procedure;
determining that the estimated drying time is inaccurate;
determining one or more reasons that the estimated drying time is inaccurate; and
providing, to at least one of the first user interface and the second user interface, information regarding the one or more reasons.

11. The method claim 1, wherein the first user interface is a first graphic user interface (GUI) generated by a web browser running on a first computer and the second user interface is a second graphic user interface (GUI) generated by a web browser running on a second computer.

12. A system for managing a drying procedure performed at a building structure after exposure to water, the system comprising:
a first user interface having a first access authorization level and configured to transmit, through a communication network, a control instruction;
a second user interface having a second access authorization level; and
a server configured to:
receive, through the communication network, drying procedure data obtained by one or more sensors at the building structure;
generate first drying procedure information regarding the drying procedure based on the drying procedure data and the first access authorization level, at least a portion of the first drying procedure information being different from any portion of the drying procedure data, the first drying procedure information comprising at least one of timing information, moisture information, humidity information, temperature information, electrical power information, voltage information, current information, cost information, image information, thermal image information, audio information, and equipment information;
generate second drying procedure information based on the drying procedure data and the second access authorization level, the second drying procedure information being different from the first drying procedure information and comprising at least one of timing information, moisture information, humidity information, temperature information, electrical power information, voltage information, current information, cost information, image information, thermal image information, audio information, and equipment information;
transmit the first drying procedure information through the communication network to the first user interface;
receive, through the communication network, the control instruction from the first user interface,
transmit the control instruction through the communication network, the control instruction configured to control equipment at the building structure undergoing the drying procedure to remove moisture from at least a portion of a building material forming at least a portion of the building structure; and
transmit the second drying information through the communication network to the second user interface, the second drying information based on the drying procedure data, the second drying information different from the first drying procedure information, the second user interface configured to receive, through the communication network, the second drying procedure information, the second user interface being restricted, based on the second access authorization level, from transmitting control instructions through the communication network to equipment at the structure.

13. The system of claim 12, further comprising a third user interface, the server configured to transmit third drying procedure information through the communication network to the third user interface, the third drying procedure information based on the drying procedure data and being different from the first drying procedure information and the second drying procedure information, the third drying procedure information based on a third access authorization level associated with the third user interface.

14. The system in accordance with claim 13, wherein:
the first user interface is a contractor user interface for use by a contractor to control and monitor the drying procedure;
the second user interface is a structure owner user interface for use by an owner of the building structure; and
the third user interface is a third party user interface for use by an insurance company representative.

15. The system of claim 14, further comprising:
a monitoring device configured to transmit the drying procedure data from the structure to the server; and
drying equipment, the control instruction for configuring the drying equipment.

16. The system of claim 15, wherein the control instruction comprise a power instruction to turn off the drying equipment.

17. The system of claim 15, wherein the monitoring device comprises:
a communication interface configured to receive the control instruction through a wireless communication link.

18. The system of claim 14, further comprising:
a monitoring device configured to transmit the drying procedure data from the structure to the server, the control instruction for configuring the monitoring device.

19. The system of claim 12, wherein the building material is selected from the group consisting of drywall, brick, concrete, pressboard, plaster, carpet, wood, plywood, and insulation.

20. The system of claim 12, wherein the first user interface is a first graphic user interface (GUI) generated by a web browser running on a first computer and the second user interface is a second graphic user interface (GUI) generated by a web browser running on a second computer.

21. A system for managing a drying procedure performed at a structure after exposure to water, the system comprising:
a server configured to generate and transmit, in accordance with a first access authorization level and through a communication network to a first user interface, first drying procedure information regarding the drying procedure based on drying procedure data acquired by one or more sensors at the structure undergoing the drying procedure to remove moisture from at least a portion of a building material forming at least a portion of the structure,
the server configured to receive, in accordance with a second access authorization level, control instructions from a second user interface to control equipment at the structure and to restrict, in accordance with the first access authorization level, the first user interface from transmitting the control instructions to the server,
the server configured to generate and transmit, through the communication network to the second user interface, second drying procedure information regarding the drying procedure based on the drying procedure data, the second drying procedure information being different from the first drying procedure information, at least a portion of the first drying procedure information being different from any portion of the drying procedure data, each of the first drying procedure information and the second during procedure information comprising at least one of timing information, moisture information, humidity information, temperature information, electrical power information, voltage information, current information, cost information, image information, thermal image information, audio information, and equipment information.

22. A system for managing a drying procedure performed at a building structure after exposure to water, the system comprising:
a server connected to a first user interface through a communication network and connected to a second user interface through the communication network:
a plurality of sensors positioned within a building structure undergoing the drying procedure to remove moisture from at least a portion of building material of the building structure;
drying equipment positioned within the building structure; and
a monitoring device comprising:
a data interface configured to receive signals from the plurality of sensors and to generate drying procedure data from the signals; and
a communication interface connected to the data interface and configured to receive the drying procedure data from the data interface and to the send the drying procedure data to the server,
the server configured to generate first drying procedure information based on the drying procedure data and to generate second drying procedure data from the drying procedure data, the second drying procedure information being different from the first drying procedure information, at least a portion of the first drying procedure information being different from any portion of the drying procedure data, each of the first drying procedure information and the second during procedure information comprising at least one of timing information, moisture information, humidity information, temperature information, electrical power information, voltage information, current information, cost information, image information, thermal image information, audio information, and equipment information,
the server configured to send, in accordance with a first access authorization level, the first drying procedure information, through the communication network, to the first user interface and to send, in accordance with a second access authorization level, the second drying procedure information, through the communication network, to the second user interface,
the server configured to receive control information from the first user interface and to send the control information to the data interface, the data interface configured to control the drying equipment in accordance with the control signal; the second user interface being restricted, based on the second access authorization level, from transmitting any control information through the communication network to the server for controlling the drying equipment.

23. The system of claim 22, wherein the server is configured to generate third drying procedure information from the drying procedure data and to send the third drying procedure information to a third user interface through the communication network, the third drying procedure information different from the first drying procedure information and the second drying procedure information, the third drying procedure information based on a third access authorization level associated with the third user interface.

24. The system of claim 22, wherein the drying procedure data comprises moisture data indicating a moisture level of the at least the portion of the building material.

25. The system of claim 22, wherein the drying procedure data comprises at least one of a temperature at the building structure, an indoor humidity level at the building structure, an outdoor humidity level at the building structure, and a dissipated power value indicating power dissipated by the drying equipment.

26. The system of claim 22, wherein the building material is selected from the group consisting of wood, plywood, drywall, brick, concrete, pressboard, plaster, carpet, and insulation.

* * * * *